US012409539B2

(12) United States Patent
Thiele et al.

(10) Patent No.: US 12,409,539 B2
(45) Date of Patent: Sep. 9, 2025

(54) SYSTEM AND METHOD FOR AUTONOMOUSLY REMOVING FASTENERS EMBEDDED IN WOOD PRODUCTS

(71) Applicant: Urban Machine, Inc., Oakland, CA (US)

(72) Inventors: Alexander Thiele, Oakland, CA (US); Eric Law, Lafayette, CA (US); Maxwell Micali, Oakland, CA (US); Andrew Gillies, Lafayette, CA (US); Tyler Compton, Oakland, CA (US); Alexander Galitskiy, San Francisco, CA (US)

(73) Assignee: Urban Machine, Inc., Oakland, CA (US)

( * ) Notice: Subject to any disclaimer, the term of this patent is extended or adjusted under 35 U.S.C. 154(b) by 371 days.

(21) Appl. No.: 18/117,214

(22) Filed: Mar. 3, 2023

(65) Prior Publication Data
US 2023/0281793 A1    Sep. 7, 2023

Related U.S. Application Data

(60) Provisional application No. 63/419,244, filed on Oct. 25, 2022, provisional application No. 63/316,933, (Continued)

(51) Int. Cl.
  *B25C 11/00*    (2006.01)
  *B23P 19/06*    (2006.01)
  (Continued)

(52) U.S. Cl.
  CPC .............. *B25C 11/00* (2013.01); *B23P 19/06* (2013.01); *B25J 9/0093* (2013.01); *B25J 9/1679* (2013.01);
  (Continued)

(58) Field of Classification Search
  CPC ........ B25C 11/00; B25C 11/02; B25J 11/005; B25J 15/0028; B25J 15/02–024;
  (Continued)

(56) References Cited

U.S. PATENT DOCUMENTS 10,701,228 B1 *   6/2020   Yoshidome ............. B65H 7/14
2002/0194741 A1   12/2002   Willoughby
(Continued)

FOREIGN PATENT DOCUMENTS

CN    111805484 A  * 10/2020 ............. B25C 11/00
DE    202019002301 U1 * 10/2019
KR    20110123068 A  * 11/2011

OTHER PUBLICATIONS

Machine Translation and Original Patent CN 111805484 (Year: 2020).*

(Continued)

*Primary Examiner* — Tyrone V Hall, Jr.
(74) *Attorney, Agent, or Firm* — Run8 Patent Group, LLC; Peter Miller

(57) ABSTRACT

A method includes: receiving a recycled wood workpiece populated with a set of metal fasteners; accessing an internal imaging scan; detecting the set of metal fasteners embedded in the recycled wood workpiece based on internal features detected in the internal imaging scan; for each metal fastener in the set of metal fasteners, extracting an initial position and an initial orientation of the metal fastener from the internal imaging scan; generating a virtual model of the recycled wood workpiece based on the internal imaging scan; accessing an image captured by an optical sensor; detecting a first metal fastener in the recycled wood workpiece; deriving a first position and a first orientation of the first metal fastener; and, in response to identifying the first metal fastener analogous to an initial metal fastener in the virtual model, (Continued)

isolating the first metal fastener in the virtual model and generating a fastener removal schedule.

20 Claims, 9 Drawing Sheets

Related U.S. Application Data filed on Mar. 4, 2022, provisional application No. 63/316,935, filed on Mar. 4, 2022.

(51) Int. Cl.

| | |
|---|---|
| *B25J 9/00* | (2006.01) |
| *B25J 9/16* | (2006.01) |
| *B25J 11/00* | (2006.01) |
| *B25J 15/00* | (2006.01) |
| *B27G 3/00* | (2006.01) |
| *G01N 23/04* | (2018.01) |
| *G06T 7/00* | (2017.01) |
| *G06T 7/50* | (2017.01) |
| *G06T 7/60* | (2017.01) |
| *G06T 7/73* | (2017.01) |
| *G06T 17/00* | (2006.01) |
| *G06T 19/00* | (2011.01) |

(52) U.S. Cl.
CPC ........... *B25J 9/1697* (2013.01); *B25J 11/005* (2013.01); *B27G 3/00* (2013.01); *G01N 23/04* (2013.01); *G06T 7/001* (2013.01); *G06T 7/50* (2017.01); *G06T 7/60* (2013.01); *G06T 7/75* (2017.01); *G06T 17/00* (2013.01); *G06T 19/00* (2013.01); *B25J 15/00* (2013.01); *G01N 2223/401* (2013.01); *G01N 2223/421* (2013.01); *G01N 2223/619* (2013.01); *G01N 2223/652* (2013.01); *G06T 2207/10116* (2013.01); *G06T 2207/30136* (2013.01); *G06T 2207/30161* (2013.01); *G06T 2207/30164* (2013.01); *G06T 2219/004* (2013.01)

(58) Field of Classification Search
CPC ........ B25J 9/026; B25J 9/0093; B25J 9/1697; B25J 9/1669; B25J 9/1679; G06T 2207/30161; G06T 2207/10116
See application file for complete search history.

(56) References Cited

U.S. PATENT DOCUMENTS

| | | |
|---|---|---|
| 2010/0014784 A1 | 1/2010 | Silverbrook et al. |
| 2013/0202090 A1 | 8/2013 | Belcher et al. |
| 2015/0084990 A1 | 3/2015 | Laor |
| 2015/0131108 A1 | 5/2015 | Kainer et al. |
| 2019/0304236 A1 | 10/2019 | Chan et al. |
| 2021/0258557 A1 | 8/2021 | Mesher |

OTHER PUBLICATIONS

Machine Translation and Original Patent DE 202019002301 (Year: 2019).*
Machine Translation and Original Patent KR20110123068 (Year: 2011).*
International Search Report received in PCT/US2023/014506 dated Aug. 11, 2023.

* cited by examiner

SYSTEM AND METHOD FOR AUTONOMOUSLY REMOVING FASTENERS EMBEDDED IN WOOD PRODUCTS

CROSS-REFERENCE TO RELATED APPLICATIONS

This application claims the benefit of U.S. Provisional Application No. 63/316,933, filed on 4 Mar. 2022, 63/316,935, filed on 4 Mar. 2022, and 63/419,244, filed on 25 Oct. 2022, each of which is incorporated in its entirety by this reference.

TECHNICAL FIELD

This invention relates generally to the field of material recycling and more specifically to a new and useful system for autonomously removing fasteners embedded in wood products in the field of material recycling.

DESCRIPTION OF THE EMBODIMENTS

Figure 1:
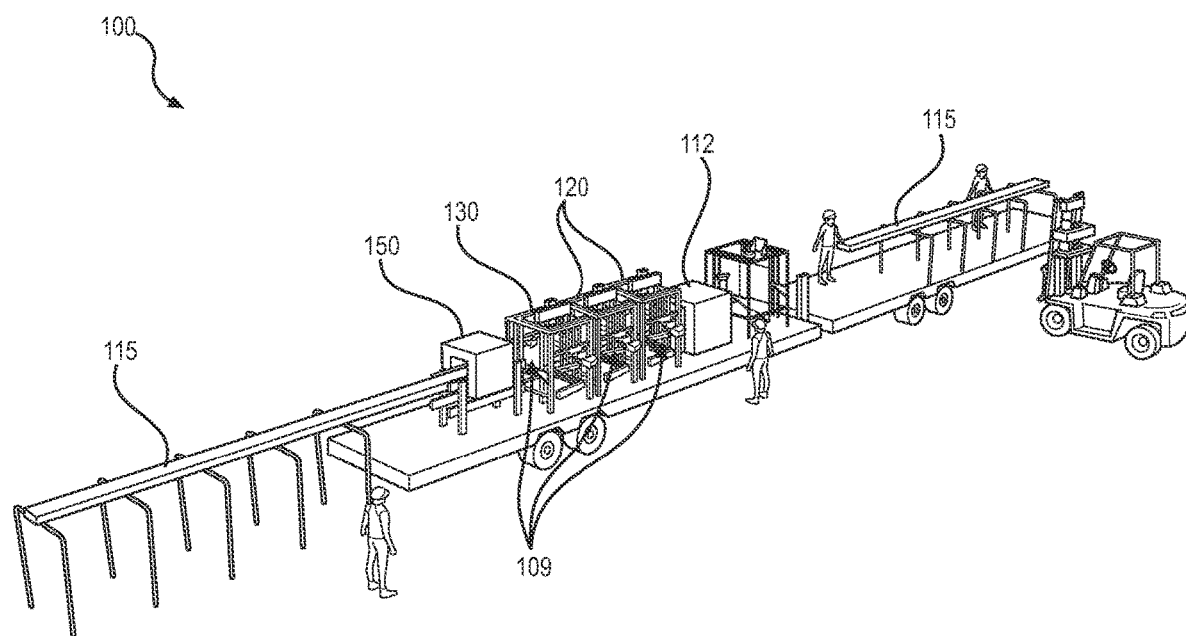
FIG. 1 is a schematic representation of a system.
Figure 2:
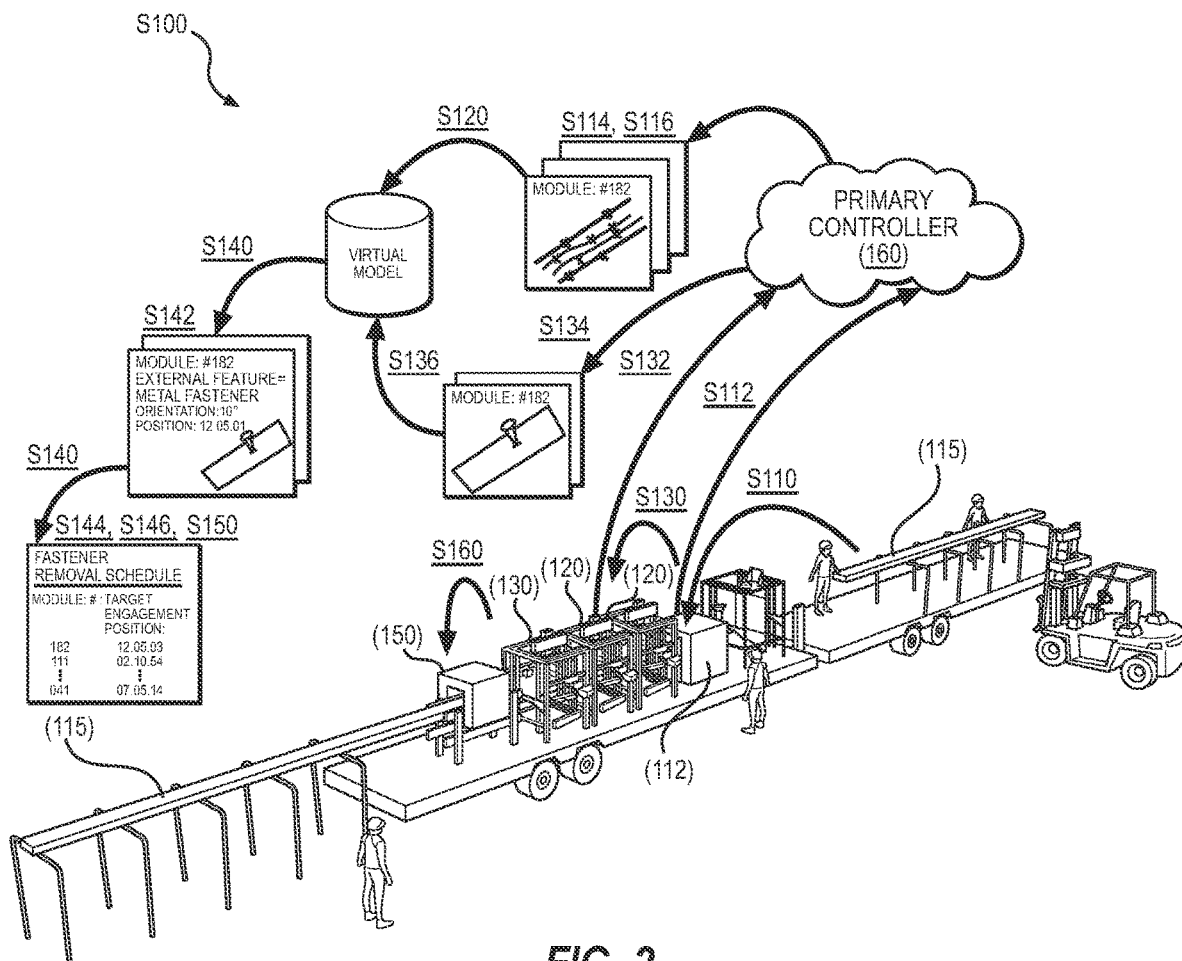
FIG. 2 is a flowchart representation of a method.
Figure 3A:
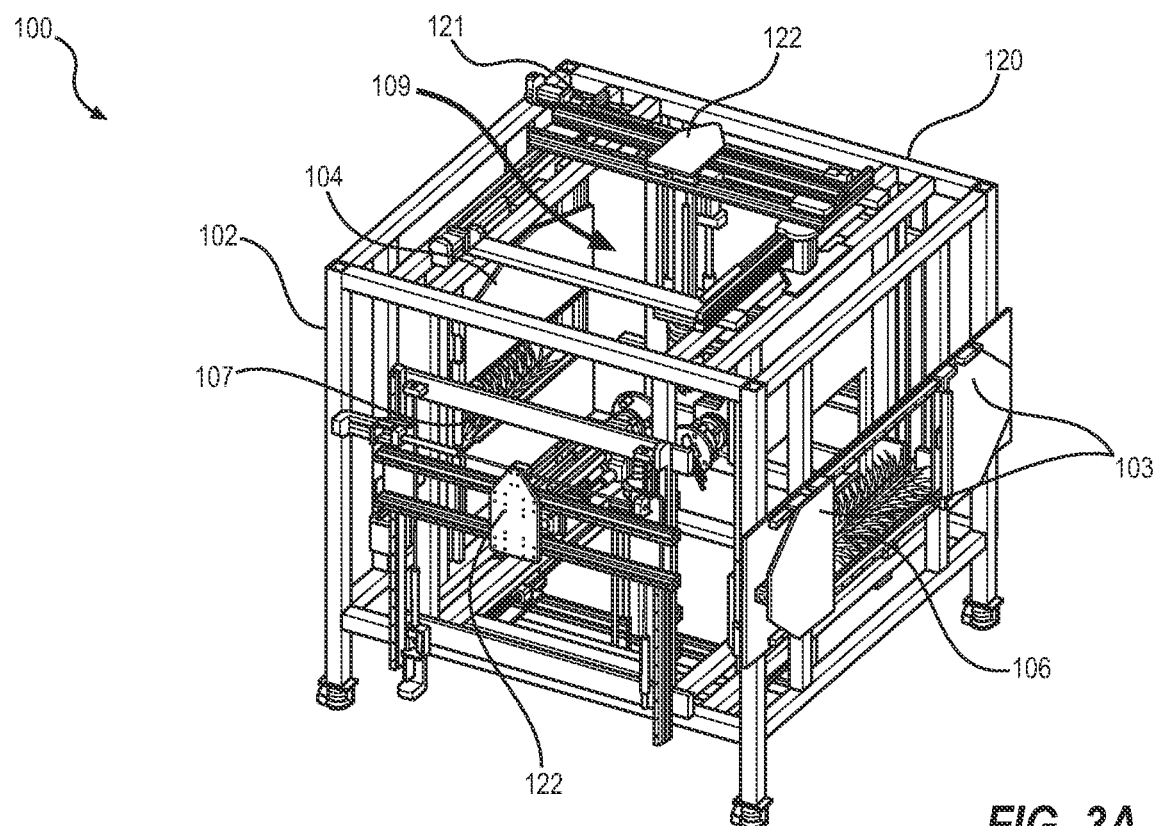
FIGS. 3A and 3B are schematic representations of one variation of the system.
Figure 3B:
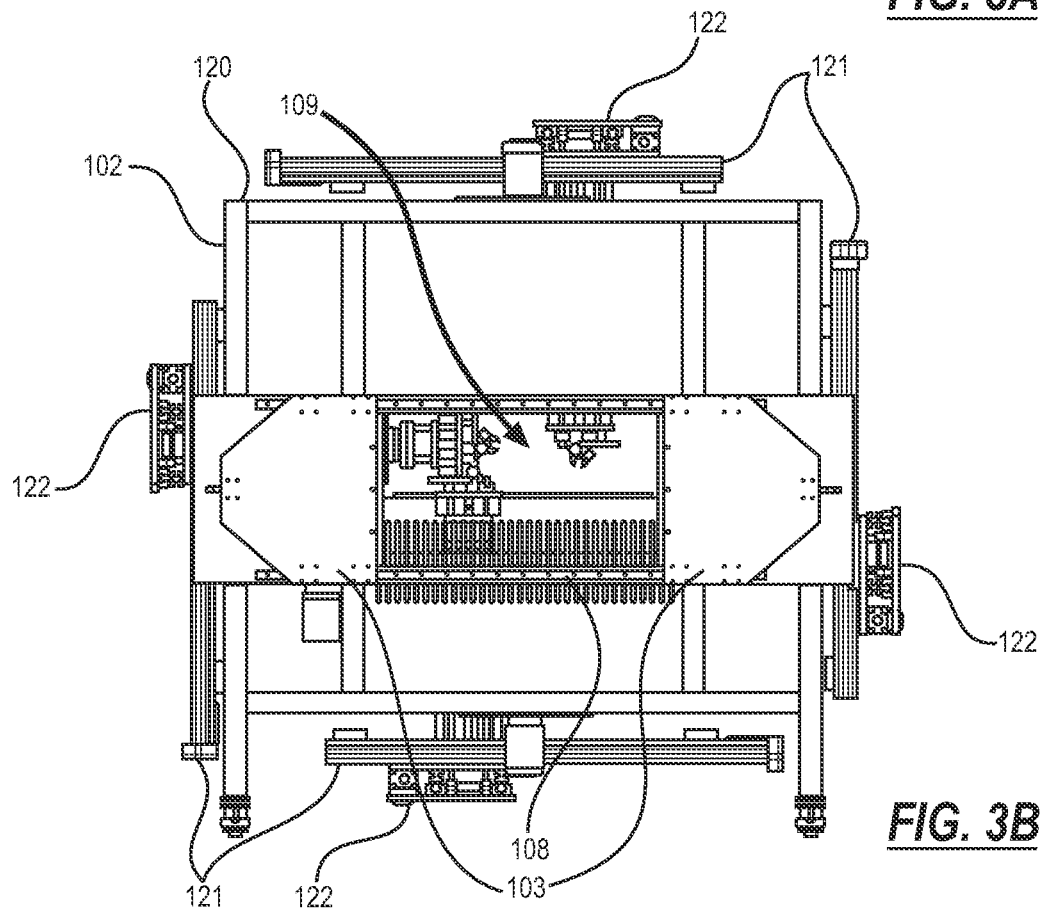
Figure 4A:
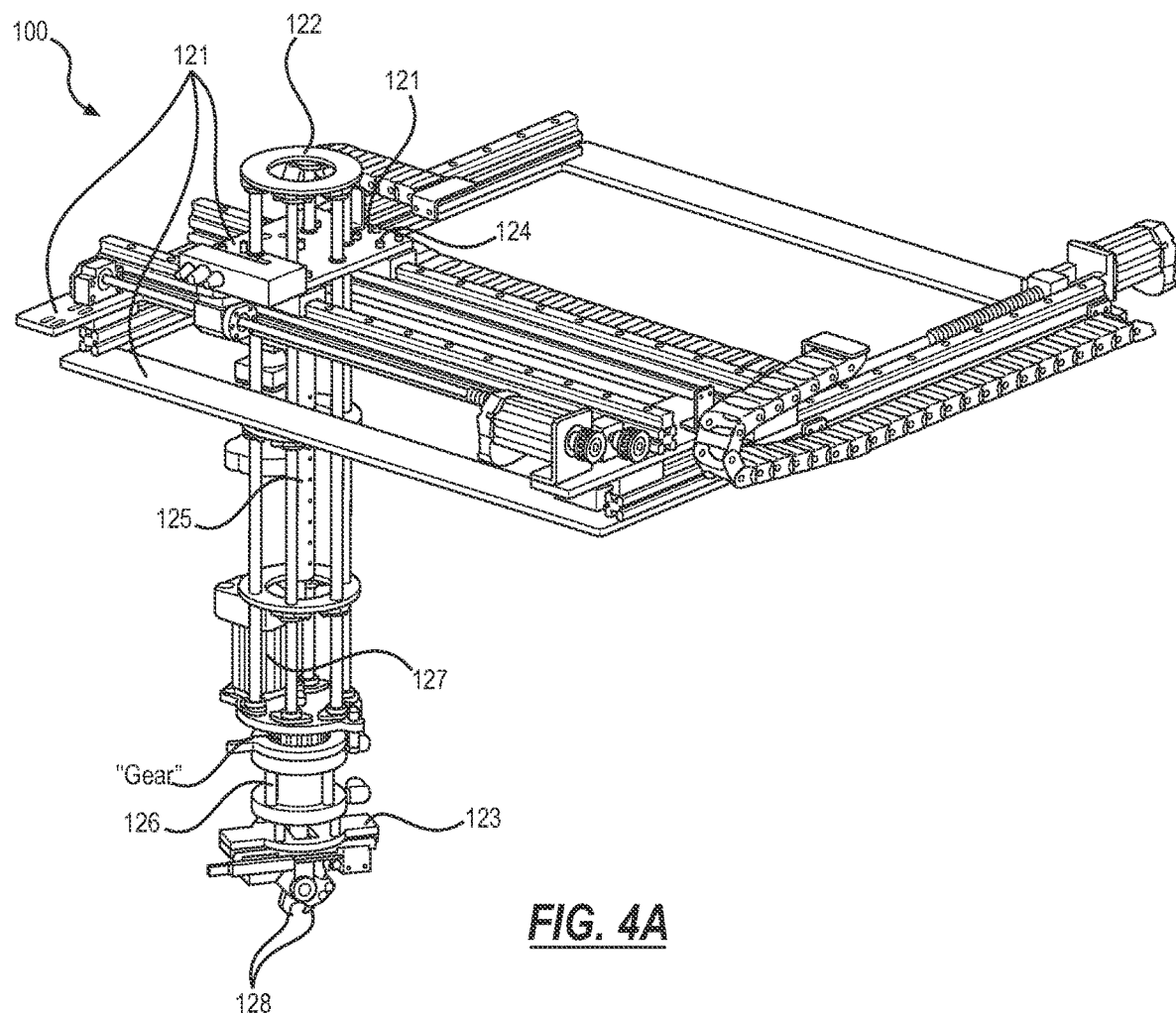
FIGS. 4A and 4B are schematic representations of one variation of the system.
Figure 4B:
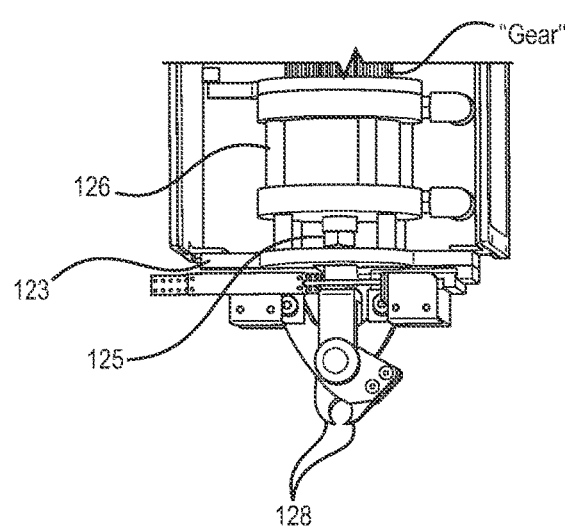
Figure 5:
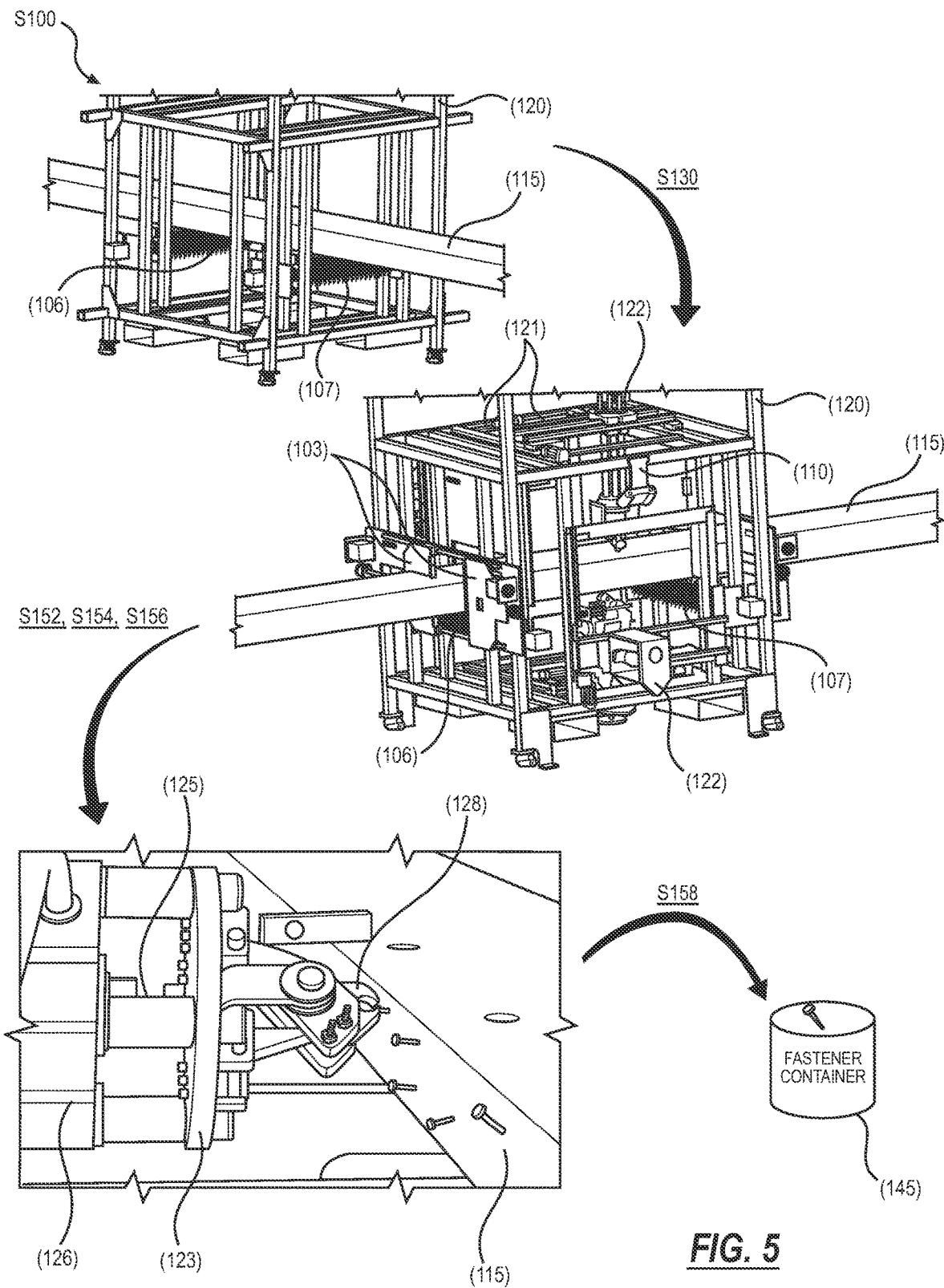
FIG. 5 is a flowchart representation of one variation of the method.
Figure 6A:
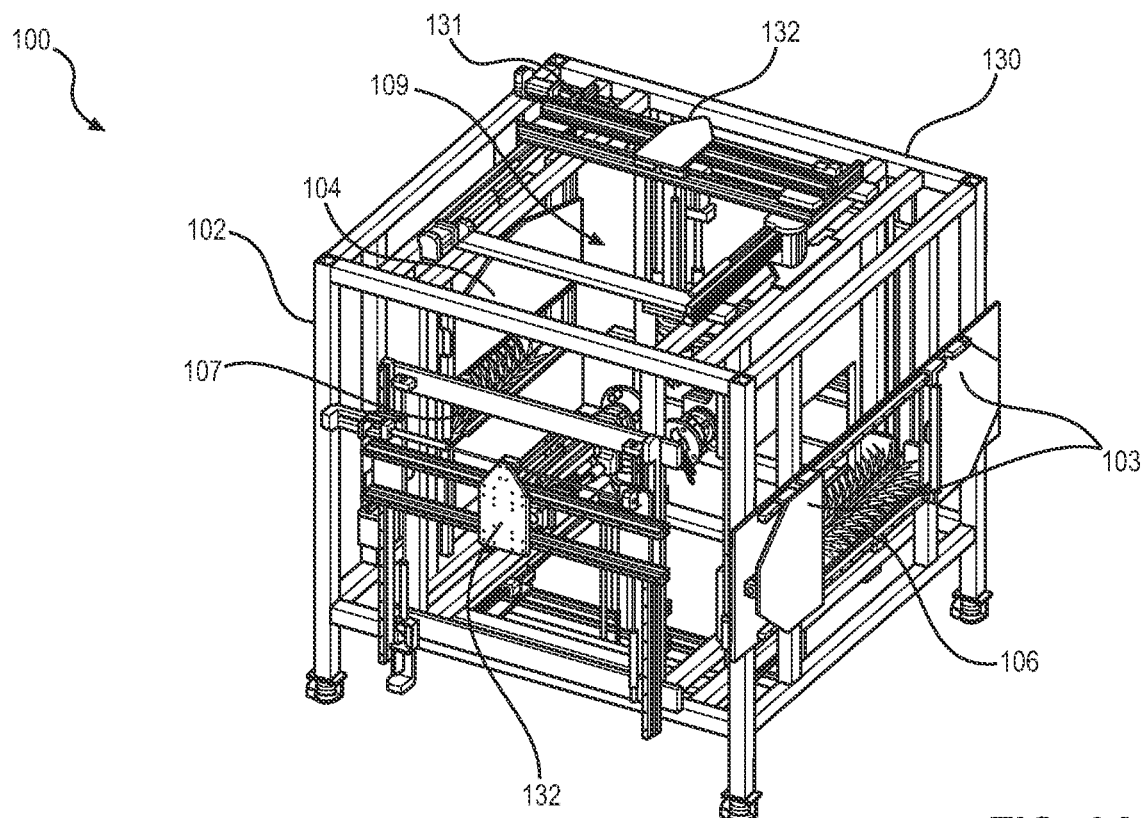
FIGS. 6A and 6B are schematic representations of one variation of the system.
Figure 6B:
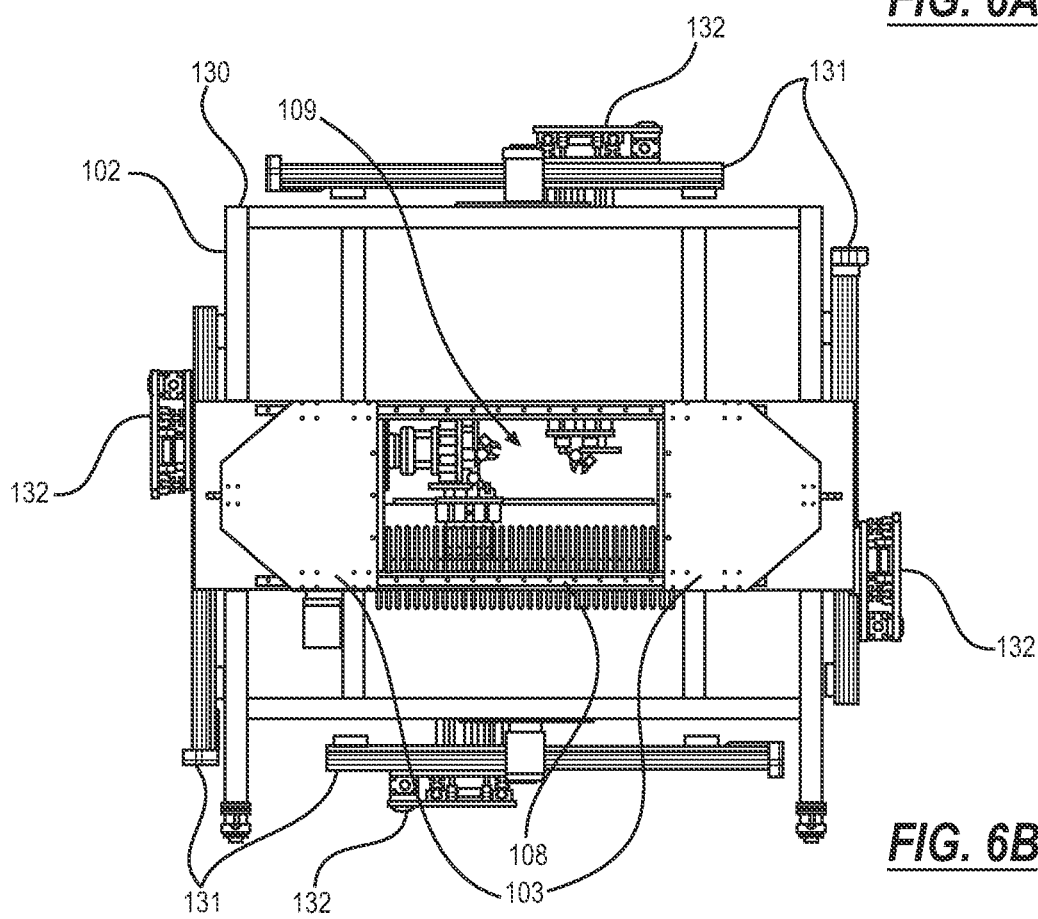
Figure 7A:
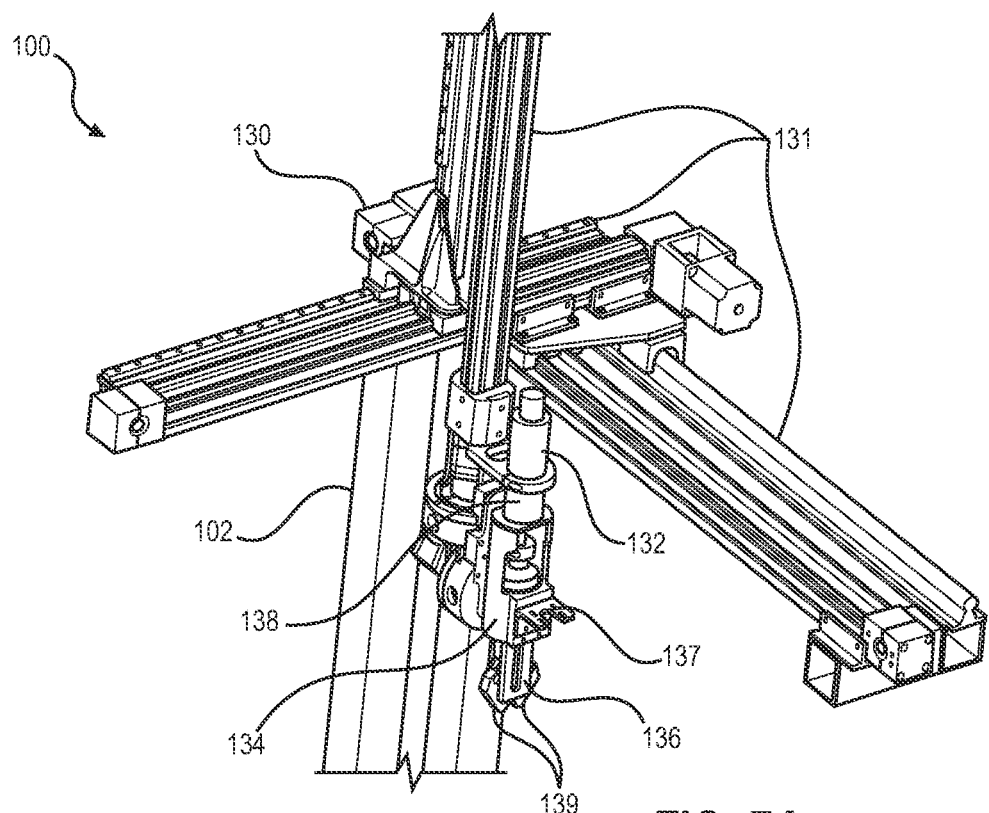
FIGS. 7A and 7B are schematic representations of one variation of the system.
Figure 7B:
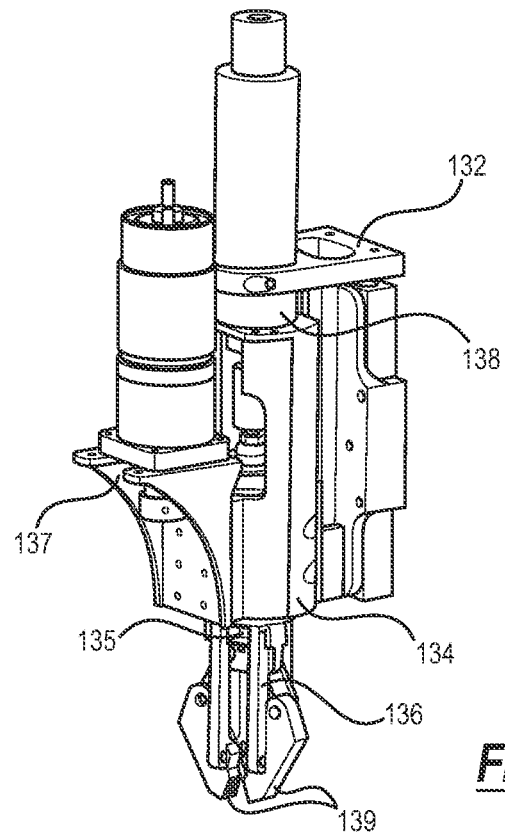

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 1, 3A, 3B, 4A, 4B, 6A, 6B, 7A, and 7B, a system 100 for autonomously removing fasteners embedded in a recycled wood workpiece 115 includes: an X-ray scan module 112; a chassis 102; a conveyor 105; an optical sensor 110 (e.g., 3D depth camera); a fastener extractor module (e.g., a non-threaded fastener extractor module 120, a threaded fastener extractor module 130); a metal scan module 150; and a primary controller 160.

The chassis 102 defines a scan volume and a work volume 109. The conveyor 105 runs from an entry of the chassis 102 to an exit of the chassis 102 and is configured to receive a recycled wood workpiece 115 populated with metal fasteners. The X-ray scan module 112 is supported by and arranged within a threshold distance of the entry of the chassis 102 and includes an X-ray sensor facing the scan volume. The optical sensor 110 faces the work volume 109.

The fastener extractor module includes: a stage supported by the chassis 102; an extractor end effector supported and manipulated on the chassis 102 via the stage and configured to engage and retain metal fasteners from a section of the recycled wood workpiece 115 occupying the work volume 109; and a controller (e.g., local controller 170). The controller (e.g., local controller 170) is configured to: access a series of X-ray scans of the recycled wood workpiece 115 within the scan volume captured by the X-ray sensor; compile the series of X-ray scans into a virtual model of the recycled wood workpiece 115 annotated with positions, orientations, and fastener types of metal fasteners extracted from the series of X-ray scans; and access an image of the work volume 109 captured by the optical sensor 110. Based on features detected in the image, the controller (e.g., local controller 170) is further configured to detect a first metal fastener in the section of the recycled wood workpiece 115 occupying the work volume 109 and extract a position and orientation of the first metal fastener. The controller (e.g., local controller 170) is also configured to: map the first metal fastener in the section of the recycled wood workpiece 115 to the virtual model based on the position and orientation of the first metal fastener; and prescribe a fastener removal schedule defining a tool path for the extractor end effector to extract the first metal fastener from the section of the recycled wood workpiece 115.

The metal scan module 150 is arranged on the chassis 102 within the threshold distance of the exit of the chassis 102 and includes a metal line scanner facing the scan volume and configured to detect metal fasteners within the recycled wood workpiece 115. The controller is further configured to: access a first metal scan of the recycled wood workpiece 115 within the scan volume, captured by the metal line scanner; trigger the conveyor 105 to drive the recycled wood workpiece 115 to a recycled wood workpiece 115 pallet; and reset the conveyor 105 to an initial position at the entry of the chassis 102, in response to absence of metal fasteners detected in the first metal scan of the recycled wood workpiece 115.

One variation of the system 100 includes: a chassis 102 defining a work volume 109; a conveyor 105 configured to receive the recycled wood workpiece populated with metal fasteners and configured to constrain a section of the recycled wood workpiece 115 within the work volume 109; an optical sensor 110 facing the work volume 109; a non-threaded fastener extractor module; and a controller (e.g., local controller 170). The non-threaded fastener extractor module 120 includes a stage 121 supported by the chassis 102 and a non-threaded fastener end effector 122. The non-threaded fastener end effector 122 is supported and manipulated on the chassis 102 via the stage 121 and includes: a set of jaws 128 configured to engage and retain metal fasteners from the section of the recycled wood workpiece 115; and a jaw actuator 125 configured to actuate the set of jaws 128. The controller is configured to: access an image of the work volume 109 captured by the optical sensor 110; based on a set of features detected in the image, detect a first fastener in the section of the recycled wood workpiece 115 occupying the work volume 109 and derive a first position and a first orientation of the first fastener in the work volume 109; define a first target engagement position of the non-threaded fastener end effector 122, to engage the first fastener, based on the first position and the first orientation of the first fastener within the work volume 109; trigger the stage to drive the non-threaded fastener end effector 122 to the first target engagement position; trigger the jaw actuator 125 to drive the set of jaws 128 to engage the first fastener in the section of the recycled wood workpiece 115; and trigger the stage 121 to retract the non-threaded fastener end effector 122 from the first target engagement position to extract the first fastener from the recycled wood workpiece 115.

2. Applications

Generally, the system 100 is configured to recycle used lumber (e.g., construction wood products) populated with metallic objects by: receiving an inbound recycled wood workpiece 115; scanning the inbound recycled wood workpiece 115 with a set of internal imaging, depth, and/or color sensors; implementing computer vision techniques to detect and distinguish threaded fasteners (e.g., screws) and non-threaded fasteners (e.g., straight nails, bent nails, staples) in the recycled wood workpiece 115; and then selectively manipulating a set of threaded fastener and non-threaded fastener extractor modules 120 to autonomously engage, retain, and remove these fasteners.

For example, the system 100 can process recycled wood workpieces 115 (e.g., wood products) including recycled wood workpieces 115, joists, beams, columns, and plywood sheet goods to: characterize recyclability qualities of sections of these wood products; mark or resect sections of these wood products for discard based on embedded metal, structural damage, or low recyclability quality within these sections; and detect and remove threaded fasteners (e.g., screws), non-threaded fasteners (e.g., straight nails, bent nails, staples, retainer nails), and other metallic objects embedded and/or extending above the sections of these recycled wood workpieces 115 characterized by sufficient recyclability qualities.

Furthermore, the system 100 can receive a recycled wood workpiece in a scan volume of an X-ray scan module. Then the primary controller 160 can: access internal imaging data captured by the X-ray scan module 112; detect internal features representing metallic objects (e.g., possible metal fasteners) in these internal imaging data; extract positions orientations of these internal features; identify a fastener type of each internal feature; and compile these internal imaging data into a three-dimensional representation (or "virtual model") of the recycled wood workpiece 115 annotated with positions, orientations, and fastener types (e.g., non-threaded, threaded, nail, staple, screw). The system 100 can then receive a recycled wood workpiece 115 in a work volume 109 of a fastener extractor module (e.g., non-threaded fastener extractor module 120, threaded fastener extractor module 130). The primary controller 160 can then: access optical scan data captured by an optical sensor 110 and/or set of optical sensors 110 facing the work volume 109; detect external features embedded within and/or extending above surfaces of the recycled wood workpiece 115 based on these optical scan data; map each external feature to a corresponding internal feature in the virtual model; identify each external feature and internal feature pair as a metal fastener; generate a fastener removal schedule to remove each fastener from the recycled wood workpiece 115; and transmit each fastener removal schedule to a local controller 170 of a corresponding fastener extractor module (e.g., non-threaded fastener extractor module 120, threaded fastener extractor module 130) to execute each fastener removal cycle.

2.1 Non-Threaded Fastener Extractor Module

Furthermore, the system 100 can also include a set of non-threaded fastener extractor modules 120. Each non-threaded fastener extractor module 120 includes: a stage (e.g., multi-axis stage); a non-threaded fastener end effector 122; a set of module actuators; and a local controller 170. The non-threaded fastener end effector 122 includes: a bearing plate 123; a vertical stage 124 arranged on the multi-axis stage 121 and is configured to support the bearing plate 123, advance the bearing plate 123 toward a non-threaded fastener in a recycled wood workpiece 115 occupying the work volume 109, and retract the bearing plate 123 to withdraw the non-threaded fastener from the recycled wood workpiece 115; and a jaw actuator 125 arranged on the vertical stage 124, coupled to a set of jaws 128 and configured to close the set of jaws 128 to engage the set of jaws 128 against a non-threaded fastener and to open the set of jaws 128 to release the non-threaded fastener from the set of jaws 128.

The system 100 can execute a non-threaded fastener removal cycle in conjunction with each non-threaded fastener extractor module 120. For example, the primary controller 160 can further characterize a quality of the recycled wood workpiece 115 based on internal features within the virtual model and identify each non-threaded fastener as a nail and/or a staple (e.g., straight nail, bent nail) and a characteristic of the nail and/or staple (e.g., superficial, subsurface, flush, normal, non-normal relative a surface of the recycled wood workpiece 115, dimension). The local controller 170 can then execute a non-threaded fastener removal schedule by: autonomously navigating the non-threaded fastener end effector 122 to a target engagement position, via the stage 121 (e.g., multi-axis stage), and to a target jaw position, via the yaw actuator 127 above the nail and/or staple in the recycled wood workpiece 115; and trigger the jaw actuator 125 to close the set of jaws 128 to engage the set of jaws 128 against the nail and/or staple with a target clamping force. Upon completion of the non-threaded fastener removal cycle, the local controller 170 can trigger the vertical stage 124 to retract the bearing plate 123 to extract the nail and/or staple from the recycled wood workpiece 115 and trigger the jaw actuator 125 to open the set of jaws 128 to release the non-threaded fastener from the set of jaws 128 into a fastener container 145 (e.g., waste bin).

The local controller 170 can then verify removal of the non-threaded fastener from the recycled wood workpiece 115. If the non-threaded fastener crosses a beam sensor in the fastener container 145, the local controller 170 can confirm removal of the non-threaded fastener at the end of the non-threaded fastener removal cycle. If the non-threaded fastener does not cross the beam sensor in the fastener container 145, the local controller 170 can flag the non-threaded fastener as a failure at the end of the non-threaded fastener removal cycle. Alternatively, if the offset distance of the set of jaws 128 falls below an offset distance threshold, the local controller 170 can flag the non-threaded fastener as a failure at the end of the non-threaded fastener removal cycle.

Additionally, the system 100 can implement computer vision techniques to detect and distinguish removal failures (e.g., slipped, snipped, broken, missed) for non-threaded fasteners. The system 100 can then update a fastener removal schedule to reduce failure of future fasteners with analogous characteristics such as fastener type, location relative the recycled wood workpiece 115 (e.g., subsurface, superficial, flush, normal, non-normal relative the surface of the recycled wood workpiece 115), and/or fastener size.

2.2 Threaded Fastener Extractor Module

The system 100 can also include a set of threaded fastener extractor modules 130. Each threaded fastener extractor module 130 includes: a stage 131 (e.g., a multi-axis stage); threaded fastener end effector 132; a set of module actuators; and a local controller 170. The multi-axis stage is arranged in a work volume 109 defined by the chassis 102 and faces the work volume 109. The threaded fastener end effector 132 is supported by the multi-axis stage and includes: a housing 134; a ram 136 arranged and configured to rotate in the housing 134; a set of jaws arranged on a distal end of the ram 136; a jaw actuator configured to close the set of jaws against the threaded fastener; and a ram actuator 137 (e.g., drive motor) configured to rotate the ram 136 on the housing 134. The set of module actuators is configured to manipulate the multi-axis stage 131. The local controller 170 is configured to selectively actuate the set of module actuators, the jaw actuator 138, and the ram actuator 137 to engage and remove the threaded fastener from the recycled wood workpiece 115 based on the fastener removal schedule.

Furthermore, the system 100 can execute a threaded fastener removal cycle in conjunction with the threaded fastener extractor module 130. For example, the primary controller 160 can further characterize a quality of the recycled wood workpiece 115 based on internal features within the virtual model and identify each threaded fastener as a screw and a characteristic of the screw (e.g., superficial, subsurface, flush, normal, non-normal relative a surface of the recycled wood workpiece 115, dimension). The local controller 170 can then execute a threaded fastener removal schedule by: autonomously navigating the threaded fastener end effector 132 to a target engagement position, via the stage 131 (e.g., multi-axis stage), and to a target jaw position, via the ram actuator 137 above the screw in the recycled wood workpiece 115; trigger the jaw actuator 138 to close the set of jaws 139 to engage the set of jaws 139 against the screw with a target retraction force; and trigger the ram actuator 137 to rotate the ram and the set of jaws 139 to retract the screw from the recycled wood workpiece 115. Upon completion of the threaded fastener removal cycle, the local controller 170 can trigger the stage to retract the threaded fastener end effector 132 from the target engagement position and trigger the jaw actuator 138 to open the set of jaws 139 to release the threaded fastener from the set of jaws 139 into a fastener container 145 (e.g., waste bin).

The system 100 is described herein as processing recycled wood workpieces 115 (e.g., linear construction timber), such as dimension or non-dimensional 2×4 or 2×6 recycled wood workpieces 115. However, the system 100 can additionally or alternatively process recycled wood workpieces 115 such as: joists; rafters; wood I-beams; posts, headers; laminated timber; finger-jointed timber; plywood sheet; oriented strandboard sheet; and/or MDF sheet; etc.

3. Method

As shown in FIGS. 2, 5, 8A, and 8B, a method S100 for removing fasteners from a recycled wood workpiece includes: receiving a recycled wood workpiece in a scan volume in Block S110; accessing a first set of X-ray scans captured by an X-ray sensor facing the scan volume occupied by the recycled wood workpiece in Block S112; detecting a set of internal features representing metallic objects in the first set of X-ray scans in Block S1114; compiling the first set of X-ray scans into a virtual model of the recycled wood workpiece, the virtual model annotated with the set of internal features in Block S120; receiving a section of the recycled wood workpiece in a work volume of a fastener extractor module in Block S130; accessing a first image captured by an optical sensor facing the work volume in Block S132; detecting an external feature extending above the section of the recycled wood workpiece in the first image in Block S134; and scanning the virtual model for a first internal feature, in the set of internal features, analogous to the external feature of the section of the recycled wood workpiece in Block S136. The method S100 further includes, in response to identifying the first internal feature, in the set of internal features, analogous to the external feature of the section of the recycled wood workpiece in the virtual model: identifying the external feature as a first metal fastener embedded in the section of the recycled wood workpiece in Block S140; deriving a first position and a first orientation of the first metal fastener from the virtual model in Block S142; defining a target engagement position for an extractor end effector, associated with the fastener extractor module, to engage the first metal fastener embedded in the section of the recycled wood workpiece based on the first position and the first orientation of the first metal fastener in Block S144; and generating a fastener removal schedule for the extractor end effector to remove the first metal fastener from the section of the recycled wood workpiece at the first target engagement position in Block S150.

One variation of the method S100 includes: receiving a recycled wood workpiece populated with a set of metal fasteners in Block S110; accessing a first X-ray scan captured by an X-ray sensor facing the recycled wood workpiece in Block S112; detecting the set of metal fasteners embedded in the recycled wood workpiece based on internal features detected in the first X-ray scan in Block S114; for each metal fastener in the set of metal fasteners, extracting an initial position of the metal fastener from the first X-ray scan and extracting an initial orientation of the metal fastener from the first X-ray scan in Block S116; compiling the first X-ray scan into a virtual model of the recycled wood workpiece, the virtual model annotated with initial positions and initial orientations of the set of metal fasteners in Block S120; accessing a first image captured by an optical sensor facing the recycled wood workpiece in Block S132; and, based on features detected in the first image, detecting a first metal fastener in the recycled wood workpiece occupying the work volume and deriving a first position and a first orientation of the first metal fastener in Block S142. This variation of the method S100 further includes, in response to identifying an initial metal fastener, in the set of metal fasteners, analogous to the first metal fastener in the virtual model: isolating the first metal fastener in the virtual model in Block S136; and generating a fastener removal schedule defining a tool path for an extractor end effector to extract the first metal fastener from the recycled wood workpiece based on the first position and the first orientation of the first metal fastener stored in the virtual model in Block S150.

3.1 Non-Threaded Fastener End Effector

Figure 8A:
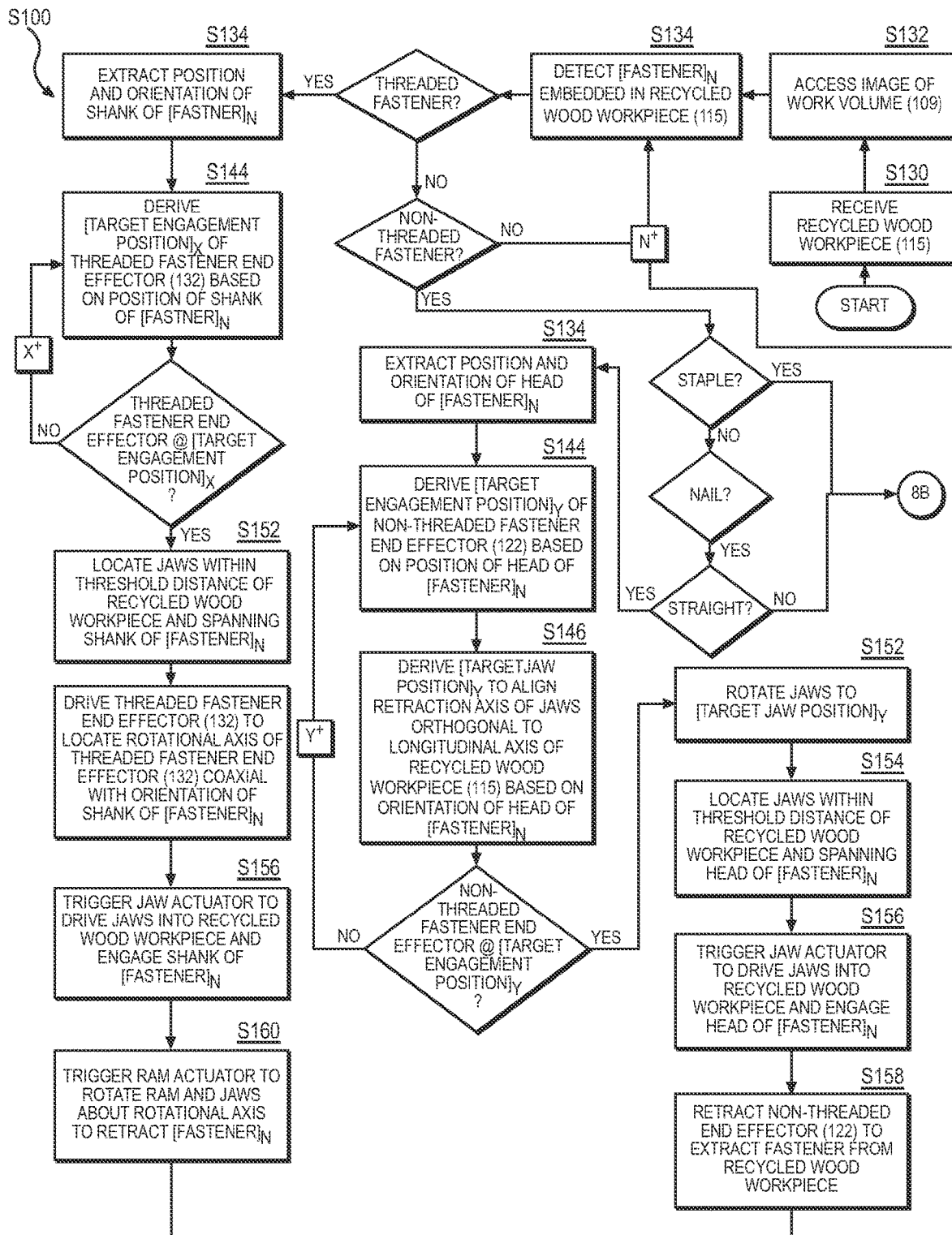
FIGS. 8A and 8B are flowchart representations of one variation of the method.
Figure 8B:
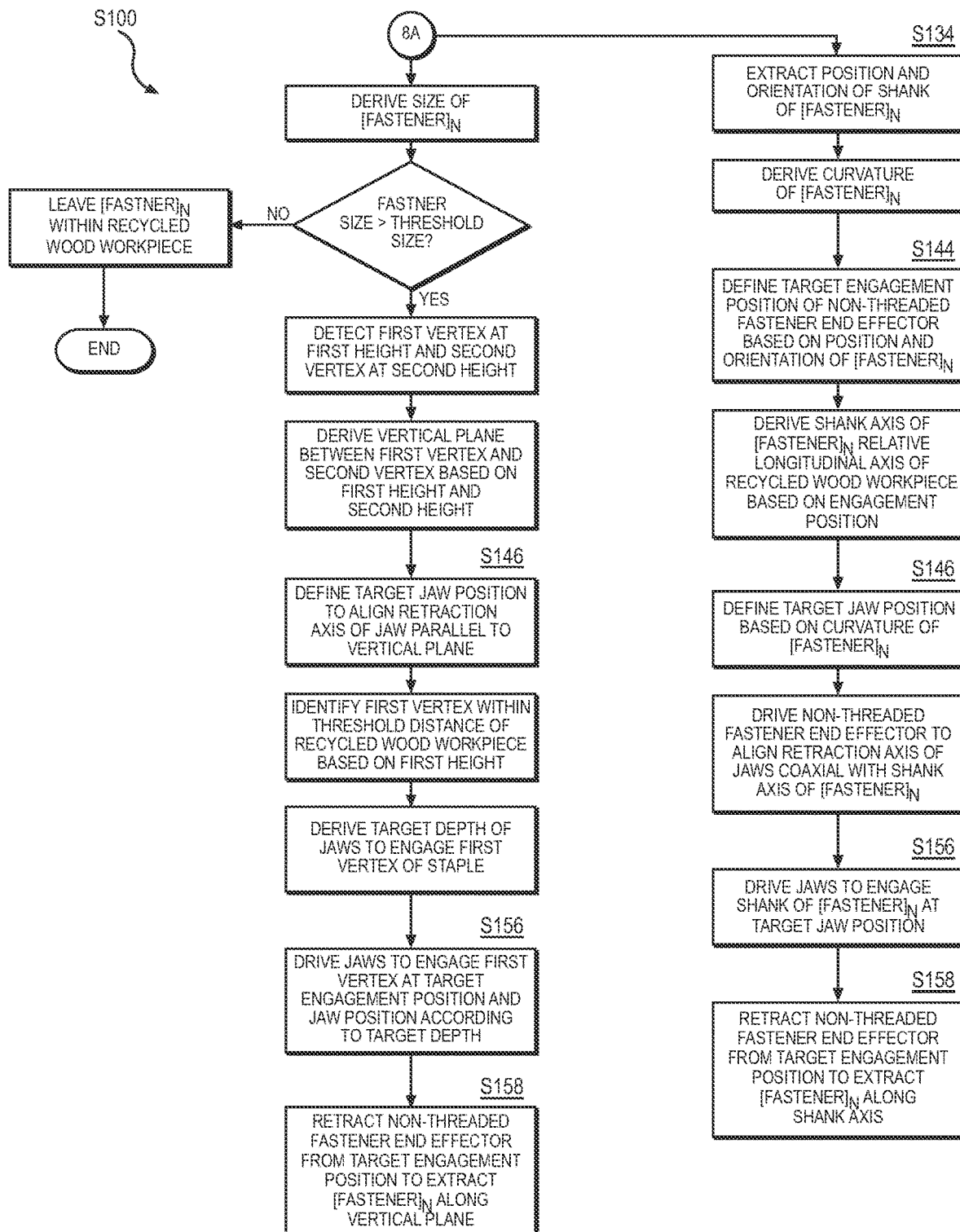

As shown in FIG. 8A, one variation of the method S100 includes: receiving a section of the recycled wood workpiece in a work volume in Block S130; accessing an image of the work volume, the image recorded by an optical sensor facing the work volume in Block S132; extracting a set of features representing the section of the recycled wood workpiece from the image; based on the set of features, detecting a fastener embedded in the section of the recycled wood workpiece and extracting a first position and a first orientation of a head of the fastener in Block S134; deriving a first target engagement position of a non-threaded fastener end effector, to engage the fastener, based on the first position of the head of the fastener in Block S144; and deriving a first target jaw position to align a retraction axis of a set of jaws orthogonal to a longitudinal axis of the recycled wood workpiece based on the orientation of the head of the fastener in Block S146. This variation of the method S100 further includes, in response to driving the non-threaded fastener end effector to the first target engagement position: rotating the set of jaws to the first target jaw position in Block S152; locating the set of jaws within a threshold distance of the section of the recycled wood workpiece spanning the head of the fastener in Block S154; triggering a jaw actuator to drive the set of jaws into the section of the recycled wood workpiece and close the set of jaws to engage the fastener in Block S156; and retracting the non-threaded fastener end effector to extract the fastener from the section of the recycled wood workpiece in Block S158.

3.2 Threaded Fastener End Effector

As shown in FIG. 8A, one variation of the method S100 includes: receiving a section of the recycled wood workpiece in a work volume in Block S130; accessing an image of the work volume, the image recorded by an optical sensor facing the work volume in Block S132; extracting a set of features representing the section of the recycled wood workpiece from the image; based on the set of features, detecting a fastener embedded in the section of the recycled wood workpiece and extracting a position and an orientation of a shank of the fastener in Block S134; and deriving a first target engagement position of a threaded fastener end effector, to engage the fastener, based on the position of the shank of the fastener in Block S144. This variation of the method S100 includes, in response to driving the threaded fastener end effector to the first target engagement position: locating the set of jaws within a threshold distance of the section of the recycled wood workpiece and spanning the shank of the fastener in Block S154; driving the threaded fastener end effector to locate a rotational axis of the threaded fastener end effector coaxial with the orientation of the shank of the fastener; triggering a jaw actuator to drive the set of jaws into the section of the recycled wood workpiece and close the set of jaws to engage the shank of the fastener in Block S156; and triggering a ram actuator to rotate the ram and the set of jaws about the rotational axis of the threaded fastener end effector to retract the first fastener from the section of the recycled wood workpiece in Block S160.

4. System

As described above, the system 100 includes: an X-ray scan module 112; a chassis 102; a conveyor 105; an optical sensor 110 (e.g., a 3D depth camera, a structured light camera configured to output RGB-D depth maps and point clouds, a two-dimensional color or hyperspectral camera, a stereoscopic color camera; a thermographic camera); a fastener extractor module (e.g., a non-threaded fastener extractor module 120, a threaded fastener extractor module 130); a metal scan module 150; and a primary controller 160.

4.1 X-Ray Scan Module

The X-ray scan module 112 is configured to capture a sequence of internal imaging data of the recycled wood workpiece 115 as a machine (e.g., a forklift) or a human operator drives the recycled wood workpiece 115 past the X-ray scan module 112 during a first segment of the processing cycle. Furthermore, the X-ray scan module 112 is arranged within a threshold distance of the entry of the chassis 102 of a first fastener extractor module in a set of fastener extractor modules (e.g., a set of non-threaded fastener extractor modules 120, a set of threaded fastener extractor modules 130) and defines a scan volume.

In one implementation, the X-ray scan module 112 includes a three-dimensional X-ray sensor facing a scan volume occupied by the recycled wood workpiece 115. In this implementation, the X-ray sensor can capture a set of X-ray scans of the recycled wood workpiece 115 as the machine (e.g., a forklift) or the human operator drives the recycled wood workpiece 115 past the X-ray scan module 112. The primary controller 160 can then compile this set of X-ray scans into a three-dimensional model (or "virtual model")—annotated with the internal features and defining a recycled wood workpiece 115 coordinate system—of the recycled wood workpiece 115.

In one variation, the X-ray scan module 112 includes a set of three-dimensional internal imaging sensors (e.g., magnetic resonance sensors, millimeter wave sensors, X-ray sensors) facing the scan volume occupied by the recycled wood workpiece 115. In this variation, each internal imaging sensor in the set of internal imaging sensors can capture a set of internal imaging scans of the recycled wood workpiece 115 as the machine (e.g., a forklift) or the human operator drives the recycled wood workpiece 115 past the X-ray scan module 112. The primary controller 160 can then implement methods and techniques described above to compile these sets of internal imaging scans into a virtual model—annotated with the internal features—of the recycled wood workpiece 115.

In another implementation, the X-ray scan module 112 includes a one-dimensional X-ray line scanner arranged over (or facing laterally across) the scan volume occupied by the recycled wood workpiece 115. In this implementation, the X-ray scanner can capture a series of X-ray line scans of the recycled wood workpiece 115 as the machine (e.g., a forklift) or the human operator drives the recycled wood workpiece 115 past the X-ray scan module 112. The primary controller 160 can then compile these X-ray line scans into a two-dimensional X-ray scan of the recycled wood workpiece 115.

4.2 Chassis

The chassis 102: defines a work volume 109 and includes an exo-structure arranged about each non-threaded fastener extractor module 120 and/or each threaded fastener extractor module 130. The exo-structure is configured to: support the stage and the extractor end effector of a non-threaded fastener extractor module 120 and/or a threaded fastener extractor module 130.

In one variation, the chassis 102 includes: a first set of lateral clamps 103 to constrain lateral sides of the recycled wood workpiece 115 at an input side (e.g., entry) of the chassis 102; a first set of vertical clamps 104 to constrain vertical sides of the recycled wood workpiece 115 at the input side of the chassis 102; a second set of lateral clamps 103 to constrain lateral sides of the recycled wood workpiece 115 at an output side (e.g., exit) of the chassis 102; and a second set of vertical clamps 104 to constrain vertical sides of the recycled wood workpiece 115 at the output side of the chassis 102.

4.3 Conveyor

The conveyor 105 is configured to receive the recycled wood workpiece 115 populated with metal fasteners and is configured to constrain a section of the recycled wood workpiece 115 within the work volume 109 of a fastener extractor module. The conveyor 105 also includes a set of (e.g., two) rollers arranged on each side of a longitudinal axis of the system 100 and cooperate to engage and position a recycled wood workpiece 115 along the longitudinal axis of the system 100.

In one implementation the conveyor 105 includes: an input roller 106 coupled to an input side of a lateral axis of the threaded fastener extractor module; a first set of standoffs 108 extending radially from the input roller 106, defining a length greater than a nominal fastener length, and configured to locate the recycled wood workpiece 115 at the input side; and an output roller 107 coupled to an output side of the lateral axis of the threaded fastener extractor module and includes a second set of standoffs 108 extending radially from the output roller 107, defining the length greater than the nominal fastener length, and configured to locate the recycled wood workpiece 115 at the output side.

In one variation, the first set of standoffs 108 extend radially from the input roller 106 and exhibit triangular cross-sections with vertices offset from the input roller 106. The second set of standoffs 108 also extend radially from the output roller 107 and exhibit triangular cross-sections with vertices offset from the output roller 107. Accordingly, the first set of standoffs 108 and the second set of standoffs 108 cooperate to locate an adjacent recycled wood workpiece 115 between the input roller 106 and the output roller 107 during the processing and the fastener removal cycles.

Additionally, the conveyor 105 includes: a set of (e.g., two, three, four) adjustable clamps configured to receive and retain the recycled wood workpiece. For example, the conveyor 105 can include: a set of lateral clamps 103 to constrain lateral sides of the recycled wood workpiece 115 at the input side of the chassis 102; and a set of vertical clamps 104 to constrain vertical sides of the recycled wood workpiece 115 at the input side of the chassis 102.

In this implementation, the input roller 106, the output roller 107, and the set of (e.g., two, four) adjustable clamps cooperate to receive and retain the recycled wood workpiece 115—in six degrees of freedom—during the processing cycle. Additionally, the set of rollers and the set of adjustable clamps cooperate to: receive and retain the recycled wood workpiece 115 during the processing cycle; and permit fastener extractor modules to access and remove fasteners—embedded and/or extending above surfaces of the recycled wood workpiece 115 occupying the work volume 109—during a fastener removal cycle.

For example, at a first time, the local controller 170 can trigger the conveyor 105 to rotate the input roller 106 to locate a section of the recycled wood workpiece 115 cantilevered within the work volume 109 of a fastener extractor module—and therefore a set of fasteners extending above this section of the recycled wood workpiece 115—as the system 100 autonomously scans this section of the recycled wood workpiece 115 with a set of optical sensors 110. The local controller 170 can then: actuate a set of lateral clamps 103 to constrain lateral sides of the recycled wood workpiece 115 at the input side of the chassis 102; and actuate a set of vertical clamps 104 to constrain vertical sides of the recycled wood workpiece 115 at the input side of the chassis 102. Thus the set of lateral clamps 103 and the set of vertical clamps 104 enable a fastener extractor module to remove fasteners from this section of the recycled wood workpiece 115 during the fastener removal cycle. At a second time, the local controller 170 can: trigger the conveyor 105 to rotate the input roller 106 to and the output roller 107 to locate the section of the recycled wood workpiece 115 outside the fastener extractor module toward a next fastener extractor module. Additionally, the input roller 106 can locate a next section of the recycled wood workpiece 115 within the work volume 109 of the fastener extractor module —and therefore a next set of fasteners extending above this section of the recycled wood workpiece 115—as the system 100 autonomously scans this section of the recycled wood workpiece 115 with the set of optical sensors 110. The local controller 170 can repeat these methods and techniques for each other fastener in the sets of fasteners and for each other section of the recycled wood workpiece 115 to remove fasteners from the recycled wood workpiece 115.

4.4 Optical Sensor

The system further includes an optical sensor 110 and/or a set of (e.g., two, three) optical sensors 110 coupled to each fastener extractor module (e.g., non-threaded fastener extractor module 120, threaded fastener extractor module 130). The optical sensor 110 faces the work volume 109 and is configured to capture a set of images of the work volume 109 occupied by the recycled wood workpiece 115 during a processing cycle and/or fastener removal schedule.

Furthermore, the primary controller 160 can access the set of images of the work volume 109 from each optical sensor 110, in the set of optical sensors 110, and stitch these images into a 3D point cloud of the work volume 109 based on: placement of each optical sensor within the coordinate system of the fastener extractor module (e.g., non-threaded fastener extractor module 120, threaded fastener extractor module 130); and analogous overlapping features in images recorded by each optical sensor 110, in the set of optical sensors 110.

4.5 Non-Threaded Fastener Extractor Module

Each non-threaded fastener extractor module 120 includes: a stage 121 (or "a multi-axis stage"); a non-threaded fastener end effector 122; a set of module actuators; and a local controller 170. The multi-axis stage 121 is arranged in a work volume 109 defined by the chassis 102 and faces the recycled wood workpiece 115. The non-threaded fastener end effector 122 is supported by the multi-axis stage 121, which includes a lateral stage and a longitudinal stage. The non-threaded fastener end effector 122 includes: a bearing plate 123; and a vertical stage 124 arranged on the multi-axis stage 121 and configured to support the bearing plate 123, advance the bearing plate 123 toward a non-threaded fastener in a recycled wood workpiece 115 occupying the work volume 109, and retract the bearing plate 123 to withdraw the non-threaded fastener from the recycled wood workpiece 115. The non-threaded fastener end effector 122 also includes: a jaw head 126 arranged on and rotationally coupled to a distal end of the bearing plate 123; a set of jaws 128 pivotably coupled to a distal end of the jaw head 126; a yaw actuator 127 arranged on the bearing plate 123, coupled to the jaw head 126, and configured to pan (i.e., rotate) the jaw head 126 about a yaw axis of the non-threaded fastener end effector 122; and a jaw actuator 125 arranged on the vertical stage 124, coupled to the set of jaws 128 via a jaw linkage including a gear and configured to close the set of jaws 128 to engage the set of jaws 128 against the non-threaded fastener and to open the set of jaws 128 to release the non-threaded fastener from the set of jaws 128.

4.6 Threaded Fastener Extractor Module

Each threaded fastener extractor module 130 includes: a multi-axis stage 131; a threaded fastener end effector 132; a set of module actuators; and a local controller 170. The multi-axis stage 131 is arranged in a work volume 109 defined by the chassis 102 and faces the linear sled stage. The threaded fastener end effector 132 is supported by the multi-axis stage 131 and includes: a housing 134; a ram 136 arranged and configured to rotate in the housing 134; a set of jaws 139 arranged on a distal end of the ram 136; a jaw actuator 138 configured to close the set of jaws 139 against the threaded fastener; and a ram actuator 137 (e.g., drive motor) configured to rotate the ram 136 on the housing 134. The set of module actuators is configured to manipulate the multi-axis stage 131. The local controller 170 is configured to selectively actuate the set of module actuators, the jaw actuator 138, and the ram actuator 137 to engage and remove the threaded fastener from the recycled wood workpiece 115 based on the fastener removal schedule.

4.7 Multiple End Effectors Per Work Volume

In one variation, each non-threaded fastener extractor module 120 can include multiple independently-operable instances of the non-threaded fastener end effector 122 such as: two, three, or four instances of the non-threaded fastener end effector 122 distributed radially about the non-threaded fastener extractor module 120 in each work volume 109; and that cooperate to access and remove non-threaded fasteners from all four sides of a section of a recycled wood workpiece 115 occupying the work volume 109.

Similarly, each threaded fastener extractor module 130 can include multiple independently operable instances of the threaded fastener end effector 132 such as: two, three, or four instances of the threaded fastener end effector 132 distributed radially about the threaded fastener extractor module 130 in each work volume 109; and that cooperate to access and remove threaded fasteners from all four sides of a section of a recycled wood workpiece 115 occupying the work volume 109.

For example, a first non-threaded fastener end effector 122 and/or threaded fastener end effector 132 faces a first side of the section of the recycled wood workpiece 115 within the work volume 109 of the fastener extractor module and the set of jaws 128, 139 are configured to engage and retain metal fasteners (e.g., nails, staples, screws) from the first side of the section of the recycled wood workpiece 115. In this example, the fastener extractor module includes a second stage 121, 131 supported by the chassis 102, a second non-threaded fastener end effector 122, and/or threaded fastener end effector 132: facing a second side orthogonal to the first side of the section of the recycled wood workpiece 115 within the work volume 109; supported and manipulated on the chassis 102 via the second stage 121, 131; including a second set of jaws 128, 139 configured to engage and retain metal fasteners (e.g., nails, staples, screws) from the second side of the section of the recycled wood workpiece 115; and including a second jaw actuator 125, 138 configured to actuate the second set of jaws 128, 139. The local controller 170 of the fastener extractor module can access a second image of the work volume 109 captured by the optical sensor 110 and based a second set of features detected in the second image: detect a second fastener in the second side of the section of the recycled wood workpiece 115 occupying the work volume 109; and derive a second position and a second orientation of the second fastener in the work volume 109.

The local controller 170 can then: define a second target engagement position of the second non-threaded fastener end effector 122 and/or threaded fastener end effector 132, to engage the second fastener, based on the second position and the second orientation of the second fastener; derive a fastener extraction order for the first stage 121, 131 and the second stage 121, 131 based on the first engagement position and the second engagement position; trigger the second stage 121, 131 to drive the second non-threaded fastener end effector 122 to the second target engagement position according to the extraction order; trigger the second jaw actuator 125, 138 to drive the second set of jaws 128, 139 to engage the second fastener in the second side of the section of the recycled wood workpiece 115; and trigger the second stage 121, 131 to retract the second non-threaded fastener end effector 122 from the second target engagement position to extract the second fastener from the recycled wood workpiece 115. Additionally or alternatively, the local controller 170 can: trigger the second ram actuator 137 to rotate the second ram 136 and the second set of jaws 139 about the second rotational axis of the second threaded fastener end effector 132 to retract the second fastener from the second side of the section of the recycled wood workpiece 115.

4.7.1 Fastener Container

In one variation, the system 100 includes a single fastener container 145 (e.g., waste bin) per work volume 109, per set of non-threaded fastener extractor modules 120, per set of threaded fastener extractor modules 130, per individual non-threaded fastener extractor module 120, or per individual threaded fastener extractor module 130. In one implementation, the fastener container 145 includes a break beam or motion sensor configured to detect release of a fastener—from a threaded fastener extractor module 130 and/or a non-threaded fastener extractor module 120—into the fastener container 145 at the conclusion of each fastener removal cycle.

For example, the system 100 can include a fastener container 145 (e.g., a waste bin): arranged below the chassis 102; defining an aperture; and configured to store extracted fasteners from the recycled wood workpiece 115. The fastener container 145 can include a break beam sensor coupled to the fastener container 145 and configured to output a signal corresponding to motion across the aperture. In this example, the local controller 170 of the non-threaded fastener extractor module 120 and/or the threaded fastener extractor module 130 can: trigger the jaw actuator to disengage the set of jaws to release a fastener into the fastener container 145; and confirm extraction of the fastener into the fastener container 145 in response to the break beam sensor detecting motion across the aperture within a threshold duration (e.g., 10 seconds, 20 seconds, 30 seconds) of release of the set of jaws 128, 139 by the jaw actuator 125.

4.8 Metal Scan Module

The metal scan module 150 is configured to capture a sequence of metal scan data of the recycled wood workpiece 115 as the local controller 170 of a non-threaded fastener extractor module 120 and/or a threaded fastener extractor module 130 drives the recycled wood workpiece 115 past the metal scanner during a last segment of the processing cycle. Alternatively, the metal scan module 150 is configured to capture a set of metal scans of the recycled wood workpiece 115 as the machine (e.g., forklift) or a human operator drives the recycled wood workpiece 115 from a fastener extractor module to the metal scan module 150.

In one implementation, the metal scan module 150 includes a one-dimensional metal line scanner arranged over (or facing laterally across) the recycled wood workpiece 115. In this implementation, the metal scanner can transmit an electromagnetic field into the recycled wood workpiece 115 to detect any fasteners (e.g., metal objects) that went undetected during previous segments of the processing cycle. Then, in response to absence of fasteners in the recycled wood workpiece 115, the primary controller 160 can trigger the conveyor 105 to drive the recycled wood workpiece 115 forward to a recycled wood workpiece 115 pallet and reset the conveyor 105 to a home position.

Alternatively, in response to detecting a fastener and/or a set of fasteners in the recycled wood workpiece 115, the primary controller 160 can trigger the conveyor 105 to drive the recycled wood workpiece 115 forward to a recycled wood workpiece 115 receival pallet to resect a section of the recycled wood workpiece 115 containing the fastener and/or to restart the processing cycle.

In one variation, the local controller 170 of a non-threaded fastener extractor module 120 and/or a threaded fastener extractor module 130 can generate a resection schedule to resect a section of the recycled wood workpiece 115 containing the fastener. For example, in response to absence of correlation between an external feature—detected in an image captured by an optical sensor—of the section of the recycled wood workpiece 115 to an internal feature in the virtual model, the primary controller 160 can: define a bounding region containing the external feature in the image; flag the bounding region with a resection flag; generate a resection schedule to resect a subsection of the recycled wood workpiece 115 corresponding to the bounding region in the image; and assign the resection schedule to a corresponding fastener extractor module to resect the subsection of the recycled wood workpiece 115.

4.9 Primary Controller

The primary controller 160 is coupled to actuators and sensors within the system 100 and executes methods and techniques described below to process a recycled wood workpiece 115 during a processing cycle.

5. Processing Cycle

In one implementation, at the start of a processing cycle, the human operator or the machine (e.g., forklift) loads a recycled wood workpiece 115 onto the conveyor 105—and therefore the set of (e.g., two) spiked rollers—and the primary controller 160 can then actuate the set of adjustable clamps to receive and retain the recycled wood workpiece 115. The primary controller 160 then initiates the processing cycle.

5.1 Processing Cycle: Initial Imaging

The primary controller 160 can: receive a recycled wood workpiece 115 in a scan volume; access a set of X-ray scans captured by an X-ray sensor facing the scan volume occupied by the recycled wood workpiece 115; detect a set of internal features representing metallic objects in the set of X-ray scans; and compile the first set of X-ray scans into a three-dimensional representation (or "virtual model") of the recycled wood workpiece. A first fastener extractor module can receive a section of the recycled wood workpiece in a work volume 109. The primary controller can then: access an image, in a set of images, captured by the optical sensor 110 arranged within the fastener extractor module; detect external features extending above the section of the recycled wood workpiece 115; scan the virtual model to identify each external feature with an analogous internal feature; identify each external feature as a metal fastener; and generate a fastener removal schedule for each external feature.

5.2 Processing Cycle: Virtual Model

The primary controller 160 compiles the set of X-ray scans into a virtual model of the recycled wood workpiece 115, such as depicting: internal features, representing metallic objects, and defects of the recycled wood workpiece 115.

In one implementation in which the X-ray scan module includes two fixed perpendicular line scanners or an X-ray sensor that sweeps across two axes perpendicular to the recycled wood workpiece 115 as a machine (e.g., forklift) and/or human operator advances the recycled wood workpiece 115 toward a first fastener extractor module, the system 100 can: compile the sequence of X-ray scan data captured by these X-ray scanners into a three-dimensional representation (or "virtual model") of the recycled wood workpiece 115 annotated with these internal features (e.g., metallic objects and defects).

Furthermore, the primary controller 160 can: access an X-ray scan of the recycled wood workpiece 115 occupying the scan volume; detect a set of internal features (i.e., set of metal fasteners) populated in the recycled wood workpiece 115; detect a helical ridge fastener in the set of metal fasteners based on a features detected in the X-ray scan; extract an initial position and an initial orientation of the helical ridge fastener in the set of metal fasteners; correlate the features representing the helical ridge fastener with known features of threaded fasteners from a threaded fastener database; compile correlations into the virtual model (e.g., three-dimensional model) of the work volume; and label the helical ridge fastener in the virtual model with a threaded fastener type, the initial position, and the initial orientation. The primary controller 160 can then: isolate a subsection in the virtual model containing the threaded fastener label; isolate a secondary subsection of the recycled wood workpiece 115 in an image—captured by the optical sensor facing the work volume of a fastener extractor module—corresponding to the subsection in the virtual model; extract a subset of features from a region in the image depicting the secondary subsection of the recycled wood workpiece 115 in the image; identify the subset of features as a head of a first fastener detected in the image; map the initial position and initial orientation of the helical ridge fastener from the subsection of the virtual model to the fastener head identified in the image; and identify the fastener as the helical ridge fastener in response to the first position and the first orientation of the fastener—extracted from the image—matching the initial position and the initial orientation of the helical ridge fastener from the virtual model.

Similarly, the primary controller 160 can implement these methods and techniques to detect a smooth shank fastener in the set of metal fasteners based on features detected in the X-ray scan; extract an initial position and an initial orientation of the smooth shank fastener in the set of metal fasteners; correlate the features representing the smooth shank fastener with known features of non-threaded fasteners from a non-threaded fastener database; compile correlations into the virtual model of the work volume; and label the smooth shank fastener in the virtual model with a non-threaded fastener type, the initial position, and the initial orientation. The primary controller 160 can then: isolate a subsection in the virtual model containing the non-threaded fastener label; isolate a secondary subsection of the recycled wood workpiece 115 in the image corresponding to the subsection in the virtual model; extract a subset of features from a region in the image depicting the secondary subsection of the recycled wood workpiece 115 in the image; identify the subset of features as a head of a fastener detected in the image; map the initial position and initial orientation of the smooth shank fastener from the subsection of the virtual model to the fastener head detected in the image; and identify the fastener as the smooth shank fastener in response to the first position and the first orientation—extracted from the image—of the fastener matching the initial position and the initial orientation of the first smooth shank fastener.

However, the primary controller 160 can implement any other method or technique to generate a representation of the internal features of the recycled wood workpiece 115 based on X-ray data collected by the X-ray scan module.

5.3 Processing Cycle: Internal Recycled Wood Workpiece Characteristics

The primary controller 160 can also detect internal characteristics and features of the recycled wood workpiece 115 based on these X-ray scans, such as including: splits; holes; rot; embedded metal (i.e., metallic objects fully contained within the recycled wood workpiece 115); knots; and/or fasteners (e.g., metallic objects that extend above surfaces of the recycled wood workpiece 115).

In one implementation, the primary controller 160: compiles the sequence of X-ray scan data captured by these X-ray scanners into a two- or three-dimensional representation of internal features (i.e., defects) in the recycled wood workpiece 115; and detects and extracts two-dimensional or three-dimensional constellations of features from this internal representation of the recycled wood workpiece 115. For example, the primary controller 160 can: implement blob detection, object recognition, and/or other techniques to group individual features detected in the internal representation of the recycled wood workpiece 115 into a set of feature constellations; implement artificial intelligence and/or machine learning techniques to correlate these constellations of features with known characteristics of splits, holes, rot, embedded metal, and knots; and label these constellations of features in the internal representation of the recycled wood workpiece 115 accordingly and/or project these constellations and labels onto the virtual model.

Alternatively, the primary controller 160 can access a database of template images representing various examples of these defect types, such as derived from scan data of previous recycled wood workpieces 115 processed by the system 100. Then, for each feature constellation in this set, the primary controller 160 can: compare the feature constellation to a template image in the database; and characterize a similarity of the feature constellation to the template image. If this similarity exceeds a threshold similarity, the primary controller 160 can annotate the feature constellation with a defect type and other attributes stored in or associated with the template image.

However, the primary controller 160 can implement any other method or technique to detect or characterize internal features of the recycled wood workpiece 115 based on X-ray scan data captured by the X-ray scan module.

5.4 Processing Cycle: Superficial Fasteners

The primary controller 160 can also interpret types, positions, and/or orientations of fasteners on each side of the recycled wood workpiece 115 from these X-ray and optical scan data.

5.4.1 Recycled Wood Workpiece Faces

In one implementation, the primary controller 160 implements plane detection techniques to detect a set of faces (e.g., six "sides") in the virtual model that are approximately perpendicular. For each face detected in the virtual model, the primary controller 160: isolates a set of superficial points in the virtual model that represent this face; calculates a plane characterized by least error (e.g., shortest Euclidean distance) between the plane and the set of superficial points; and stores the plane as a ground plane of this face in the virtual model.

In another implementation, the primary controller 160: implements plane detection techniques to detect a set of faces (e.g., six sides) in the virtual model that are approximately perpendicular; retrieves virtual recycled wood workpiece 115 geometry, such as a virtual rectangular cuboid (or virtual rectangular prism); projects the virtual recycled wood workpiece 115 geometry onto the virtual model; resizes and warps (e.g., curve) faces of the virtual recycled wood workpiece 115 geometry to minimize error between each face of the virtual recycled wood workpiece 115 geometry and points representing the corresponding faces of the virtual model; and stores the faces of the first recycled wood workpiece 115 geometry as ground planes of the faces in the virtual model.

For example, the primary controller 160 can detect a set of faces of the recycled wood workpiece 115 in the virtual model and access a template geometry representing geometry of known faces of the recycled wood workpiece 115. Then, for each face in the set of faces, the primary controller 160 can: isolate a set of superficial points of the face in the virtual model; project the template geometry of a known face onto the set of superficial points of the face in the virtual model; calculate an offset distance between the template geometry of the known face and the set of superficial points of the face in the virtual model; and, in response to the offset distance falling below a threshold offset distance, store the template geometry of the known face as a ground plane of the face in the virtual mode.

5.4.2 Fastener Locations

In one implementation, for a first face in the virtual model, the primary controller 160: scans the virtual model for discrete clusters of points extending above the ground plane of the first face and representing internal features; and labels each cluster of points representing an internal feature as a possible fastener.

Then, for a first cluster of points representing a first possible fastener, primary controller 160 can: isolate a first subset of points—representing a shank of an initial internal feature—intersecting (e.g., nearest) the ground plane of the first face in the virtual model; calculate a first centroid of the first subset of points; isolate a second subset of points of a first plane—representing a head of the initial internal feature (e.g., the top surface of a flat head of a nail or a top surface of a flat head of a screw or a top surface of a connecting segment and/or leg of a staple)—within a threshold distance of the ground plane of the first face (e.g., furthest from the ground plane of the first face); calculate a second centroid of the second subset of points; and calculate a first vector—such as within a coordinate system of the virtual model—between the first subset of points and the second subset of points based on the first and second centroids. The primary controller 160 can then label the first cluster of points in the virtual model with the first vector, representing an initial orientation and an initial position of the head of the initial internal feature.

The primary controller 160 repeats this process for each other cluster of points representing possible fasteners and repeats this process for each other side of the virtual model to annotate all possible recycled wood workpieces 115, their orientations, and their head or connecting segment locations.

5.4.3 Fastener Type+Virtual Model

Generally, the primary controller 160 can implement artificial intelligence, template matching, computer vision techniques, and/or statistical methods, etc. to: extract a set of features from a cluster of points representing a possible fastener in the virtual model or from the optical scan data directly; and to match (or "map") the set of features to a particular fastener type.

More specifically, the primary controller 160 can: detect a first subset of internal features representing metallic objects from the X-ray scans; characterize a first smoothness quality of the first subset of internal features; detect a second subset of internal features representing metallic objects from the X-ray scans; and characterize a second smoothness quality of the second subset of internal features. Then, in response to the first smoothness quality exceeding a threshold smoothness quality, the primary controller 160 can label the first subset of internal features with a non-threaded fastener type (e.g., nail, staple, nail retainer) in the virtual model. Similarly, in response to the second smoothness quality falling below the threshold smoothness quality, the primary controller 160 can label the second subset of internal features with a threaded fastener type (e.g., screw) in the virtual model.

In one implementation, for each cluster of points labeled as a metallic object (e.g., possible fastener), the primary controller 160 can: detect the first face of the recycled wood workpiece 115 in the virtual model; scan the virtual model for a set of points—representing the initial metallic object—extending above a ground plane of the first face; isolate a first subset of points—representing a head of the initial metallic object—extending above the ground plane of the first face (e.g., outside of the recycled wood workpiece 115 volume and furthest from the surface of the recycled wood workpiece 115); characterize a depth and a breadth of the head of the initial metallic object based on the first subset of points; isolate a second subset of points—representing a shank of the initial metallic object—intersecting the ground plane of the first face in the virtual model (e.g., within the recycled wood workpiece 115 volume and further from the surface of the recycled wood workpiece 115); and characterize a curvature of the shank of the initial metallic object based on the second subset of points. The primary controller 160 can then: calculate an aspect ratio of the head based on the depth and breadth of the head of the initial metallic object; in response to the aspect ratio exceeding a threshold aspect ratio and in response to the curvature of the shank of the initial metallic object exceeding a threshold curvature, identify the fastener type of the initial metallic object as a bent nail; annotate the set of points in the virtual model with a bent nail fastener type; and flag the set of points in the virtual model with a bent nail removal flag.

The primary controller 160 can also: characterize an aspect ratio of the width versus depth of the head; characterize an angle of the side of head; and characterize a curvature of the shank fastener, such as a) proportional to an error between the cluster of points that represent the fastener and the vector that defines the predicted orientation of the fastener or b) based on a radius of an arc projected onto the virtual model characterized by least error between the cluster of points that represent the fastener and the arc. Accordingly, the primary controller 160 can identify the possible fastener as a screw if: the aspect ratio is low; the head angle indicates that the head defines a countersunk profile; and/or if the curvature is less than a threshold radius. Otherwise, the primary controller 160 can identify the fastener as a nail.

The primary controller 160 can then: annotate a cluster of points in the virtual model identified as a screw with a screw removal flag; and similarly annotate a cluster of points in the virtual model identified as a nail with a nail removal flag.

In yet another implementation, for each cluster of points labeled as a metallic object (e.g., possible fastener), the primary controller 160 can: detect the first face of the recycled wood workpiece 115 in the virtual model; scan the virtual model for a set of points—representing the initial metallic object—extending above a ground plane of the first face; isolate a first subset of points—representing a crown or body of the initial metallic object—extending above the ground plane of the first face; isolate a second subset of points—representing a first leg of the initial metallic object—orthogonal to the first subset of points and intersecting the ground plane of the first face (e.g., within the recycled wood workpiece 115 volume and adjacent the first subset of points); isolate a third subset of points—representing a second leg of the initial metallic object—orthogonal to the first subset of points and opposite the second subset of points intersecting the ground plane of the first face; and characterize a dimension of the initial metallic object based on the first, second, and third subsets of points representing the first leg, the crown, and the second leg. The primary controller 160 can then, in response to the dimension of the initial metallic object exceeding a threshold dimension: identify the fastener type of the initial metallic object as a staple; annotate the set of points in the virtual model with a staple fastener type; and flag the set of points in the virtual model with the staple removal flag.

5.4.4 Fastener Data from X-Ray Scans

In the variation described above in which the X-ray scanner captures 3D X-ray data of the recycled wood workpiece 115, the primary controller 160 can also assimilate superficial 3D optical data representing a fastener and adjacent internal X-ray data representing a metallic object into one composite representation of the fastener. The primary controller 160 can then implement methods and techniques described above to: detect a first cluster of X-ray-based points representing the distal end of the fastener—embedded in the recycled wood workpiece 115—in the virtual model; calculate a first centroid of the first cluster of points; isolate a second cluster of optical-based points furthest from the ground plane of the corresponding face of the virtual model; calculate a second centroid of the second cluster of optical-based points; calculate a vector—such as within a coordinate system of the virtual model—extending between the first and second centroids; and store this vector as the orientation of the fastener.

In a similar implementation, the primary controller 160 can: calculate an arc characterized by minimum error (e.g., minimum aggregate Euclidean distance) between the arc and X-ray- and optical-based points that represent the fastener in the virtual model; calculate a tangent of this arc at its intersection with the ground plane of the corresponding face in the virtual model; and store a vector—defining this tangent in the coordinate system of the virtual model—as the orientation of the fastener.

In this variation, the primary controller 160 can also verify or predict the fastener type based on the X-ray scan data. In one implementation, the primary controller 160: identifies a cluster of points in the X-ray scan data depicting a cylindrical metallic object within the volume of the recycled wood workpiece 115 (and contiguous with a fastener identified about a ground plane of a face in the virtual model); identifies this cluster of points as a shank or barrel of a fastener; and characterizes a smoothness quality of the shank or barrel of the fastener. For example, the primary controller 160 can: map a sawtooth pattern onto the cluster of points, such as extending between the distal and proximal ends of the fastener as described above; calculate an amplitude and frequency of the sawtooth pattern that minimizes an error (e.g., a Euclidean distance) between the sawtooth pattern and the cluster of points; and characterize smoothness of the fastener inversely proportional to the amplitude and frequency. The primary controller 160 can then: identify the fastener as a nail if smoothness exceeds a threshold smoothness (e.g., the amplitude and frequency of the projected sawtooth pattern fall below threshold values); and otherwise identify the fastener as a threaded fastener (e.g., a screw).

For example, the local controller 170 can: detect a set of internal features representing metallic objects in the X-ray scans within the virtual model; access an image captured by the optical sensor 110 facing the work volume 109; detect an external feature extending above the section of the recycled wood workpiece 115 in the image; extract a position and orientation of the external feature in the image; detect a first face of the recycled wood workpiece 115 within the virtual model containing the external feature; characterize a smoothness quality of the first internal feature corresponding to the external feature based on the virtual model; and, in response to the smoothness quality exceeding a threshold smoothness quality, identify the external feature as a nail embedded in the first face of the recycled wood workpiece 115. The local controller 170 can then: define a target engagement position for a non-threaded fastener end effector 122 (e.g., nail extractor end effector), associated with a non-threaded fastener extractor module 120 (e.g., nail fastener extractor module), to engage the nail embedded in the first face of the recycled wood workpiece 115 based on the position and orientation of the nail; and derive a nail removal schedule for the non-threaded fastener end effector 122 to remove the nail from the first face of the recycled wood workpiece 115 at the target engagement position.

Alternatively, in response to the smoothness quality falling below a threshold smoothness quality, the local controller 170 can identify the external feature as a screw embedded in the first face of the recycled wood workpiece 115. The local controller 170 can then: define a target engagement position for a threaded fastener end effector 132 (e.g., screw extractor end effector), associated with a threaded fastener extractor module 130 (e.g., screw fastener extractor module), to engage the screw embedded in the first face of the recycled wood workpiece 115 based on the position and orientation of the screw; and derive a screw removal schedule for the threaded fastener end effector 132 to remove the screw from the first face of the recycled wood workpiece 115 at the target engagement position.

In one variation, the primary controller 160 can: extract a profile of the cluster of points from the X-ray scan data; implement template matching to match the profile to a stored nail or threaded fastener profile; and/or implement artificial intelligence to identify a fastener type corresponding to this profile. In this variation, the primary controller 160 can then fuse this X-ray-based predicted fastener type with an optical-based predicted fastener type of an adjacent or contiguous fastener detected above the ground plane on the corresponding side of the virtual model to refine or verify the type of the fastener. For example, the primary controller 160 can: implement methods and techniques described above to derive a first fastener type prediction based on images from the optical sensor representing external features of the recycled wood workpiece 115; implement these methods and techniques to derive a second fastener type prediction based on X-ray scan data representing internal features of the recycled wood workpiece 115; and combine (or "fuse") the first and second fastener type predictions into a final prediction for the type of the fastener, such as by calculating a combination of these predictions weighted by their corresponding confidence scores.

The primary controller 160 can implement this process for each other fastener and/or embedded metal detected in the X-ray scan and/or the virtual model.

5.4.5 Processing Cycle: Recycled Wood Workpiece Quality from X-Ray Scans

The primary controller cam also characterize an aggregate quality of the whole recycled wood workpiece 115 proportional to its total length and inversely proportional to: quantity of splits, length of splits, proximity of splits to the longitudinal center of the recycled wood workpiece 115; size and quantity of through and blind holes; length of recycled wood workpiece 115 containing rot and proximity of rot to the longitudinal center of the recycled wood workpiece 115; frequency of embedded metal and proximity of embedded metal to the longitudinal center of the recycled wood workpiece 115; frequency and size of knots; and/or frequency of fasteners in the recycled wood workpiece 115. Then, if the aggregate quality of the whole recycled wood workpiece 115 exceeds a threshold aggregate quality, the primary controller can generate a fastener removal schedule as described below to remove fasteners without removing sections of the recycled wood workpiece 115 or otherwise cutting down the length of the recycled wood workpiece 115. Otherwise, the primary controller can isolate discard segments to remove (or "resect") from the recycled wood workpiece 115 to increase aggregate quality of the remaining target segments of the recycled wood workpiece 115.

In one implementation, the primary controller segments the total length of the recycled wood workpiece 115 into segments of a unit length (e.g., one inch). For each segment of the recycled wood workpiece 115, the primary controller implements methods and techniques described above to: detect a set of defects present in this segment of the recycled wood workpiece 115; and calculate segment quality of this segment of the recycled wood workpiece 115 based on the types and scopes (e.g., sizes of holes, depths of splits, porosity from dry rot, quantity of fasteners). If the segment quality of a segment is less than a threshold segment quality, the primary controller can locate a set of resection flags on the virtual model to define removal of this segment from the recycled wood workpiece 115.

Furthermore, if the combined (e.g., average) quality of any contiguous sequence of segments of the recycled wood workpiece 115 is less than a threshold segment group quality, the primary controller can locate a set of resection flags on the virtual model for removal of this contiguous sequence of segments.

The primary controller can then prescribe sub-lengths of the recycled wood workpiece 115 between this set of resection flags. For each sub-length of the recycled wood workpiece 115, the primary controller 160 can: implement methods and techniques described above to recalculate an aggregate quality of the sub-length; flag the sub-length in the virtual model for fastener removable and reclamation (e.g., up-recycling back into a full-length recycled wood workpiece 115) if the aggregate quality of the sub-length exceeds the threshold aggregate quality and a minimum length (e.g., one foot); and/or flag the sub-length in the virtual model for fastener removal and recycling (e.g., down-cycling into OSB or MDF) if the aggregate quality of the sub-length is less than the threshold aggregate quality and/or less than the minimum length (e.g., one foot) and the primary controller detects no embedded metal inside the segment (i.e., absence of metal not connected to a nail or screw head at or above the surface of the recycled wood workpiece 115). Otherwise, if the aggregate quality of the sub-length is less than the threshold aggregate quality and/or less than the minimum length (e.g., one foot) and if the primary controller detects metal fully embedded in the segment, the primary controller 160 can flag the sub-length in the virtual model for discard (and no fastener removal).

5.4.6 Fastener Removal Schedule

Therefore, the primary controller 160 can execute the foregoing methods and techniques to: generate a virtual model representing internal and/or external features of the recycled wood workpiece 115; detect locations, orientations, and types of fasteners on the recycled wood workpiece 115; characterize quality of the recycled wood workpiece 115; identify segments of the recycled wood workpiece 115 to discard; and annotate the virtual model with cut locations for discarding recycled wood workpiece 115 segments and removing fasteners.

The primary controller 160 can then: define a target engagement position for an extractor end effector, of a fastener extractor module corresponding to a type of each fastener, to engage each fastener embedded within and/or extending above the section of the recycled wood workpiece based on position and orientations of each fastener; and generate a fastener removal schedule executable by the system 100 to selectively remove fasteners from the recycled wood workpiece 115. More specifically, the primary controller 160 can generate a fastener extraction order—containing fastener removal schedules for each fastener extractor module—that assigns each fastener, flagged for removal in the virtual model, for removal by one fastener extractor module of the corresponding fastener type at a target engagement position; and prescribes a tool path to each flagged fastener for its removal, such as based on the type and the orientation of each flagged fastener.

6. Variation: Sled Based Conveyance+Optical Scan Module

One variation of the system 100 includes: a chassis 102; a sled; a sled actuator; a sled position sensor; an X-ray scanner; an optical scanner; a set of fastener extractor modules (e.g., non-threaded fastener extractor modules 120, threaded fastener extractor modules 130); a metal scanner; and a primary controller 160.

6.1 Chassis

The chassis 102: defines a work volume 109 and includes an exo-structure arranged about each non-threaded fastener extractor module 120 and/or each threaded fastener extractor module 130. The exo-structure is configured to: support the stage of a non-threaded fastener extractor module 120 and/or a threaded fastener extractor module 130; and support the extractor end effector of a non-threaded fastener module 120 and/or a threaded fastener extractor module 130.

In one implementation, the chassis 102: supports the linear sled stage, which extends from the entry of the chassis 102 to the exit of the chassis 102; and includes an exo-structure arranged about the linear sled stage and configured to support arrays (e.g., columns) of fastener extractor modules about the linear sled stage.

In one variation, the chassis 102 includes: an assembly of extruded metal profiles (e.g., aluminum, steel) that form a set of cuboid exoskeletons arranged in series. Each cuboid exoskeleton can: define a work volume 109 (e.g., operating theater); include mounting points for a fastener extractor module, scanner, or other actuator; and support the linear sled stage proximal the sagittal axis of the cuboid exoskeleton. In this implementation, the linear sled stage can extend: from a first work volume 109 (e.g., containing the X-ray scanner) at the entry of the system 100 to a last work volume 109 (e.g., containing the metal scanner) at the exit of the system 100.

However, the chassis 102 can define any other structure or arrangement of elements.

6.2 Sled

The sled rides on the linear sled stage and includes a set of clamps configured to receive and retain a recycled wood workpiece 115 during a processing cycle as the system 100 autonomously scans the recycled wood workpiece 115 with the X-ray and optical scanners and then removes fasteners from the recycled wood workpiece 115.

In one implementation, the sled includes: a set of standoffs 108 that rise above the stage to offset the recycled wood workpiece 115 above the stage and thus permit the scanners and fastener extractor modules to visually access and remove fasteners from (most of) the surface of the recycled wood workpiece 115 facing the stage during the processing cycle; and an adjustable clamp arranged on each standoff and configured to retain a section of the recycled wood workpiece 115 against its corresponding standoff.

6.2.1 Sled Actuator+Sled Position Sensor

The sled actuator is configured to drive the sled- and the recycled wood workpiece 115 clamped thereto—through the series of work volumes 109 from the entry of the chassis 102 toward the exit of the chassis 102 during a processing cycle.

In one implementation, the sled actuator includes a stepper or servo motor coupled to the linear sled stage via a belt or lead screw. In this implementation, the primary controller 160 can track the position of the sled—and therefore the recycled wood workpiece 115—along the linear sled stage based on angular rotations or positions of the stepper or servo motor.

In another implementation, the sled includes a linear encoder coupled to or integrated into the linear sled stage. In this implementation, the primary controller 16o can track or read the longitudinal position of the linear sled stage—and therefore the recycled wood workpiece 115—within the system 100 from this linear encoder.

6.3 X-Ray Scanner

The X-ray scanner is arranged on the chassis 102 proximal the entry of the chassis 102 and is configured to capture a sequence of X-ray scan data of the recycled wood workpiece 115 at the sled as the sled actuator drives the recycled wood workpiece 115 past the X-ray scanner during a first segment of the processing cycle.

In one implementation, the X-ray scanner includes a one-dimensional X-ray line scanner arranged over (or facing laterally across) the linear sled stage between the entry of the chassis 102 and the optical scanner. In this implementation, the X-ray scanner can capture a series of X-ray line scans of the recycled wood workpiece 115 as the sled actuator drives the sled and the recycled wood workpiece 115 forward past the X-ray scanner. The primary controller 160 can then compile these X-ray line scans—based on cotemporal positions of the sled on the linear sled stage—into a two-dimensional X-ray scan of the recycled wood workpiece 115.

In another implementation, the X-ray scanner includes: a one-dimensional X-ray line scanner; and an X-ray stage configured to sweep the X-ray scanner between a position located over and a position facing laterally across the linear sled stage. In this implementation, the X-ray scanner can capture a first series of X-ray line scans through a sagittal axis of the recycled wood workpiece 115 and a second series of X-ray line scans through a lateral axis of the recycled wood workpiece 115 as the sled actuator drives the sled and the recycled wood workpiece 115 forward past the X-ray scanner. The primary controller 160 can then compile these X-ray line scans—based on cotemporal positions of the sled on the linear sled stage—into a three-dimensional X-ray scan of the recycled wood workpiece 115.

In a similar implementation, the X-ray scanner includes: a first one-dimensional X-ray line scanner arranged over the linear sled stage between the entry of the chassis 102 and the optical scanner; and a second one-dimensional X-ray line scanner arranged facing laterally across the linear sled stage between the entry of the chassis 102 and the optical scanner. In this implementation, the X-ray scanner can capture: a first series of X-ray line scans through a sagittal axis of the recycled wood workpiece 115 via the first X-ray scanner; and a second series of X-ray line scans through a lateral axis of the recycled wood workpiece 115 via the second X-ray scanner. The primary controller 160 can then compile these X-ray line scans—based on cotemporal positions of the sled on the linear sled stage—into a three-dimensional X-ray scan of the recycled wood workpiece 115.

In the foregoing implementations, the X-ray scanner can alternatively include a two-dimensional X-ray scanner, and the primary controller 160 can implement similar methods and techniques to stitch two-dimensional X-ray scans— captured by the X-ray scanner—into a two- or three-dimensional X-ray scan of the recycled wood workpiece 115.

6.4 Optical Scan Module

The optical scan module is similarly arranged proximal the X-ray scanner opposite the entry of the chassis 102 and is configured to capture a sequence of optical scan data of the recycled wood workpiece 115 during a second segment of the processing cycle following the first segment of the processing cycle.

In one implementation, the optical scan module includes a one-dimensional color (e.g., RGB, multispectral) line scanner arranged over (or facing laterally across) the linear sled stage between the entry of the chassis 102 and the optical scanner. In this implementation, the optical scan module can capture a series of optical line scans of the recycled wood workpiece 115 as the sled drives the sled and the recycled wood workpiece 115 forward past the optical scanner. The primary controller 160 can then compile these optical line scans—based on cotemporal positions of the sled on the linear sled stage—into a two-dimensional optical scan of the recycled wood workpiece 115.

In another implementation, the optical scan module includes: a one-dimensional color line scanner; and an optical stage configured to sweep the optical scanner between a position located over and a position facing laterally across the linear sled stage. In this implementation, the optical scan module can capture a first series of optical line scans through a sagittal axis of the recycled wood workpiece 115 and a second series of optical line scans through a lateral axis of the recycled wood workpiece 115 as the sled drives the sled and the recycled wood workpiece 115 forward past the optical scanner. The primary controller 160 can then compile these optical line scans—based on cotemporal positions of the sled on the linear sled stage—into a three-dimensional optical scan of the recycled wood workpiece 115.

In a similar implementation, the optical scan module includes: a first one-dimensional color line scanner arranged over the linear sled stage between the entry of the chassis 102 and the optical scanner; and a second one-dimensional optical line scanner arranged facing laterally across the linear sled stage between the entry of the chassis 102 and the optical scanner. In this implementation, the optical scan module can capture: a first series of optical line scans through a sagittal axis of the recycled wood workpiece 115 via the first optical scanner; and a second series of optical line scans through a lateral axis of the recycled wood workpiece 115 via the second optical scanner. The primary controller 160 can then compile these optical line scans— based on cotemporal positions of the sled on the linear sled stage—into a three-dimensional optical scan of the recycled wood workpiece 115.

In the foregoing implementations, the optical scan module can additionally or alternatively include: a structured light camera (configured to output RGB-D depth maps and point clouds); a two-dimensional color or hyperspectral camera; a stereoscopic color camera; a depth camera; and/or a thermographic camera; etc. The primary controller 160 can implement similar methods and techniques to stitch these two- and/or three-dimensional optical scans—captured by the optical scanner—into a two- or three-dimensional virtual representation of the recycled wood workpiece 115 (e.g., a "virtual model").

6.5 Fastener Extractor Modules

In this variation, the system 100 also includes a set of fastener extractor modules, each: mounted to the exo-structure between the optical scanner and the exit of the chassis 102; including an end effector configured to engage a fastener on the recycled wood workpiece 115; and including a set of actuators configured to manipulate the end effector, on the exo-structure of the chassis 102, to retract the fastener from the recycled wood workpiece 115 during a third segment of the processing cycle.

In particular, each fastener extractor module: is configured to mount within a work zone defined by the chassis 102; includes an end effector configured to engage a particular type of fastener (e.g., a screw, a nail, a staple); and configured to navigate the end effector—independently of the other fastener extractor modules—to target and remove fasteners of a corresponding type in a segment of the recycled wood workpiece 115 occupying the same work volume 109, as further described below.

6.6 System Configuration

In one configuration, the chassis 102 and the sled: are configured to retain and manipulate a single recycled wood workpiece 115 up to 30 feet in length, two recycled wood workpieces 115 up to 15 feet in length, or three recycled wood workpieces 115 up to 10 feet in length, etc.; and include an arrangement of clamps to retain such combinations of recycled wood workpiece 115 lengths. In this implementation, the primary controller 160 executes processes described below for each recycled wood workpiece 115 concurrently located on the sled during one processing cycle.

In this configuration, the system 100 can include a series of eight work volumes 109 behind the X-ray scanner, including: a first row of four threaded fastener (e.g., screws) removal modules arranged overhead the linear sled stage, each exhibiting an actuation radius of 3 feet over the linear sled stage; a first row of four non-threaded fastener (e.g., nails, staples) removal modules arranged overhead the linear sled stage, interposed between the four threaded fastener extractor modules 130, and each exhibiting an actuation radius of 3 feet over the linear sled stage; and similar rows of interleaved threaded fastener (e.g., screw) extractor modules 130 and non-threaded fastener (e.g., nails, staples) extractor modules 120 to the left of, to the right of, and under the linear sled stage.

However, the system 100 can define a series of work volumes 109 supporting any other arrangement of scanners and fastener extractor modules of any other size and/or configured to process recycled wood workpieces 115 or other wood products in any other size or format.

6.7 Processing Cycle

In this variation, at the start of a processing cycle, the primary controller 160 resets the sled to a home position at the entry of the chassis 102. An human operator or a machine (e.g., forklift) then loads a recycled wood workpiece 115 onto the sled and clamps the recycled wood workpiece 115 to the sled. Alternatively, once the recycled wood workpiece 115 is placed on the sled, the primary controller 160 can automatically trigger the clamps to close onto the recycled wood workpiece 115. The primary controller 160 then implements methods and techniques described above to initiate the processing cycle.

6.7.1 Processing Cycle: Initial Imaging

The primary controller 160 then: triggers the sled actuator to drive the sled forward along the X-ray and optical scan modules; tracks the position of the sled relative to the X-ray and optical scan modules; and collects a series of X-ray and optical (e.g., color, depth) images of the recycled wood workpiece 115 from sensors arranged within these modules as the recycled wood workpiece 115 passes through the field of view of each sensor.

6.7.2 Processing Cycle: Virtual Model

The primary controller 160 then compiles this series of optical scan data into a three-dimensional representation (or "virtual model") of the recycled wood workpiece 115, such as depicting: external surfaces (e.g., top, bottom, front, back, left, and right external surfaces) of the recycled wood workpiece 115; and volumetric representations of fasteners that extend above the external surfaces of the recycled wood workpiece 115.

In one implementation, the primary controller 160 implements image stitching techniques to assemble depth and color images—captured by the optical scanner—and concurrent positions of the sled into a "virtual model."

In one variation, the primary controller 160 further projects the X-ray scan data onto the three-dimensional representation of the recycled wood workpiece 115 to populate the virtual model with internal features and defects of the recycled wood workpiece 115. In one implementation in which the X-ray scanner defines a fixed line or two-dimensional scanner facing a single side of the sled (e.g., arranged over and facing downward toward the sled), the system 100 can: compile the sequence of X-ray scan data into a two-dimensional representation of internal features (i.e., defects) in the recycled wood workpiece 115—projected onto a plane normal to the focal axis of the X-ray scanner; and project the two-dimensional representation of internal features in the recycled wood workpiece 115 onto the three-dimensional representation of the recycled wood workpiece 115.

In another implementation in which the X-ray scanner includes two fixed perpendicular line scanners or an X-ray scanner that sweeps across two axes perpendicular to the sled as the sled advances the recycled wood workpiece 115 toward the first fastener extractor module, the system 100 can: compile the sequence of X-ray scan data captured by these X-ray scanners into a three-dimensional representation of internal features (i.e., defects) in the recycled wood workpiece 115; and align and insert the three-dimensional representation of internal features in the recycled wood workpiece 115 into the three-dimensional representation of the recycled wood workpiece 115.

However, the primary controller 160 can implement any other method or technique to generate a representation of the exterior surfaces of the recycled wood workpiece 115 based on X-ray and/or optical scan data collected by the X-ray scanner and optical sensors 110.

6.8 Fastener Removal Schedule

Therefore, the primary controller 160 can execute the foregoing methods and techniques to: generate a virtual model representing internal and/or external features of the recycled wood workpiece 115; detect locations, orientations, and types of fasteners on the recycled wood workpiece 115; characterize quality of the recycled wood workpiece 115; identify segments of the recycled wood workpiece 115 to discard; and annotate the virtual model with cut locations for discarding recycled wood workpiece 115 segments and removing fasteners.

In one configuration of the system 100 described above, the system 100 includes a series of operating modules behind the X-ray scanner, including: a row of threaded fastener (e.g., screw) removal modules, interposed with non-threaded fastener extractor modules 120, and each exhibiting an actuation radius of 3 feet overhead the linear sled stage; and a similar set of threaded fastener (e.g., screw) removal modules, interposed with non-threaded fastener extractor modules 120, on the left side of, on the right side of, and under the linear sled stage.

In this configuration, the primary controller 160 can initialize a fastener removal schedule. The primary controller 160 can also calculate a first sled position that: locates a trailing end of the recycled wood workpiece 115 under (or near) a first column of threaded fastener extractor modules 130 arranged about the sled within a threshold distance of the optical scanner; and locates a leading end of the recycled wood workpiece 115 under (or near) a last column of threaded fastener extractor modules 130 arranged about the sled near the exit of the system 100. The primary controller 160 similarly: calculates a recycled wood workpiece 115 offset between a coordinate system of the recycled wood workpiece 115—assigned in the recycled wood workpiece 115 module—and a global coordinate system of the system 100 when the sled advances to a first sled position; and writes a first code—to move the sled to the first sled position—to the fastener removal schedule.

The primary controller 160 then assigns: removal of flagged screws in a top surface of a first segment of the recycled wood workpiece 115 to the first threaded fastener extractor module 130 above the sled; removal of flagged screws in the top surface of a second segment of the recycled wood workpiece 115 to a second threaded fastener extractor module 130 above the sled; removal of flagged screws in the top surface of a third segment of the recycled wood workpiece 115 to a third threaded fastener extractor module 130 above the sled; removal of flagged screws in the left surface of the first segment of the recycled wood workpiece 115 to a first threaded fastener extractor module 130 left of the sled; and removal of flagged screws in the bottom surface of the fourth segment of the recycled wood workpiece 115 to a fourth threaded fastener extractor module 130 below the sled.

For a first flagged screw in the top surface of the first segment of the recycled wood workpiece 115 assigned to the first threaded fastener extractor module 130 over the linear sled stage, the primary controller 160 can calculate a position and orientation of the first screw in a first extractor coordinate system of the first threaded fastener extractor module 130 based on: a position (of the head of) and orientation of the first screw in the coordinate system of the virtual model; the offset between the recycled wood workpiece 115 coordinate system and the global coordinate system in the first sled position; and the offset between the recycled wood workpiece 115 coordinate system and the first extractor coordinate system. The primary controller 160 can then: locate a first predefined (or "canned") threaded fastener removal cycle relative to the position (of the head of) and orientation of the first screw in the first extractor coordinate system; and assign this first predefined threaded fastener removal cycle to the first threaded fastener extractor module 130 when the sled occupies the first sled position.

The primary controller 160 can repeat this process for each other flagged screw in the top surface of the first segment of the recycled wood workpiece 115 assigned to the first threaded fastener extractor module 130.

The primary controller 160 can then: sort or order the corresponding threaded fastener removal cycles from nearest the entry of the system 100 to the exit (or vice versa); write codes for this batch of threaded fastener removal cycles, assigned to the first threaded fastener extractor module 130, to the fastener removal schedule; and repeat this process to calculate and order threaded fastener removal cycles for groups of flagged fasteners in each other segment and side of the recycled wood workpiece 115 relative to coordinate systems of their corresponding threaded fastener extractor modules 130.

In this configuration, the primary controller 160 can then calculate a second sled position that: locates a trailing end of the recycled wood workpiece 115 under (or near) a first column of non-threaded fastener extractor modules 120 arranged about the sled just aft of the optical scanner; and locates a leading end of the recycled wood workpiece 115 under (or near) a last column of non-threaded fastener extractor modules 120 arranged about the sled near the exit of the system 100. The primary controller 160 can then: calculate a recycled wood workpiece 115 offset between a coordinate system of the recycled wood workpiece 115—assigned in the recycled wood workpiece 115 module—and a global coordinate system of the system 100 when the sled advances to the second sled position; and write a second code—to move the sled to the second sled position—to the fastener removal schedule.

Accordingly, the primary controller 160 can assign: removal of flagged nails and/or staples in a top surface of the first segment of the recycled wood workpiece 115 to the first non-threaded fastener extractor module 120 above the sled; removal of flagged nails and/or staples in the top surface of the second segment of the recycled wood workpiece 115 to a second non-threaded fastener extractor module 120 above the sled; removal of flagged nails and/or staples in the top surface of the third segment of the recycled wood workpiece 115 to a third non-threaded fastener extractor module 120 above the sled; . . . removal of flagged nails and/or staples in the left surface of the first segment of the recycled wood workpiece 115 to a first non-threaded fastener extractor module 120 left of the sled; . . . and removal of flagged nails and/or staples in the bottom surface of the fourth segment of the recycled wood workpiece 115 to a fourth non-threaded fastener extractor module 120 below the sled.

For a first flagged nail and/or staple in the top surface of the first segment of the recycled wood workpiece 115 assigned to the first nail extraction module over the linear sled stage, the primary controller 160 can calculate a position and orientation of the first nail and/or staple in a first extractor coordinate system of the first non-threaded fastener extraction module based on: a position (e.g., of the head of a nail, a connecting segment and/or leg of a staple) and orientation of the first nail and/or staple in the coordinate system of the virtual model; the offset between the recycled wood workpiece 115 coordinate system and the global coordinate system in the second sled position; and the offset between the recycled wood workpiece 115 coordinate system and the first extractor coordinate system. Accordingly, the primary controller 160 can locate a first predefined (or "canned") nail and/or staple extraction cycle relative to the position (of the head of a nail, a connecting segment and/or leg of a staple) and orientation of the first nail and/or staple in the first extractor coordinate system; and assign this first predefined nail and/or staple extraction cycle to the first non-threaded fastener module when the sled occupies the first sled position.

The primary controller 160 can repeat this process for each other flagged nail and/or staple in the top surface of the first segment of the recycled wood workpiece 115 assigned to the first non-threaded fastener extraction module.

The primary controller 160 can then: sort or order the corresponding nail and/or staple extraction cycles from nearest the entry of the system 100 to the exit (or vice versa); write codes for this batch of nail and/or staple extraction cycles, assigned to the first non-threaded fastener extraction module, to the fastener removal schedule; and repeat this process to calculate and order nail and/or staple extraction cycles for groups of flagged fasteners in each other segment and side of the recycled wood workpiece 115 relative to coordinate systems of their corresponding non-threaded fastener extraction modules.

Therefore, in this configuration, the primary controller 160 can define and order threaded fastener removal cycles simultaneously executable by up to sixteen threaded fastener extractor modules 130 arranged about the linear sled stage to remove all accessible (e.g., superficial) screws from the recycled wood workpiece 115 while the recycled wood workpiece 115 and linear sled stage occupy the first sled positions. Similarly, the primary controller 160 can define and order nail and/or staple extraction cycles simultaneously executable by up to sixteen non-threaded fastener extractor modules 120 arranged about the linear sled stage to remove all accessible (e.g., superficial) nails and/or staples from the recycled wood workpiece 115 while the recycled wood workpiece 115 and linear sled stage occupy the second sled positions.

The primary controller 160 can implement similar methods and techniques to define cut paths for one or more saws mounted to the chassis 102 or mark lines for one or more cut marking modules mounted to the chassis 102.

Alternatively, the primary controller 160 can: coordinate simultaneous removal of fasteners by threaded fastener and non-threaded fastener extractor modules 120; and/or coordinate multiple advancements of the sled to locate segments of the recycled wood workpiece 115 in particular work volumes 109 for fastener removal by threaded fastener and/or non-threaded fastener extractor modules 120 mounted in these work volumes 109. The primary controller 160 can then compile these moves and extraction cycles into the fastener removal schedule.

7. Non-Threaded Fastener Extractor Module

As described above, the system 100 can include a set of non-threaded fastener extractor modules 120 for removing non-threaded fasteners embedded within and/or extending above a recycled wood workpiece 115. Each non-threaded fastener extractor module 120 includes: a multi-axis stage 121; a non-threaded fastener end effector 122; a set of module actuators; and a local controller 170.

7.1 Gantry and Actuators

In one implementation, the multi-axis stage 121 includes a three-axis gantry (e.g., X-, Y-, and Z-axes): supported by the chassis 102; arranged in a work volume 109 over a section of the linear sled stage; configured to face (e.g., is arranged over, under, or adjacent) one side of a recycled wood workpiece 115 loaded onto the sled; and configured to support the non-threaded fastener end effector 122 over a range of vertical, lateral, and longitudinal positions to enable the non-threaded fastener end effector 122 to access non-threaded fasteners (e.g., nails, staples) in a range of positions and orientations on an adjacent side of the recycled wood workpiece 115.

In this implementation, a set of actuators can include a set of stepper or servo motors coupled to and configured to independently actuate each axis of the stage 121, such as via a belt or leadscrew. Furthermore, the non-threaded fastener extractor module 120 can include a set of position sensors—such as rotary or linear encoders coupled to the set of actuators or directly to the stage 121, respectively of each non-threaded fastener extractor module 120. The local controller 170 can track the position of each axis of the stage 121 via these position sensors and interpolate the three-dimensional position of the non-threaded fastener end effector 122—mounted to the third axis of the gantry—within the work volume 109 based on the combined positions of these axes of the stage 121.

For example, the three-axis gantry is arranged in the work volume 109 and facing a first side of the recycled wood workpiece 115 loaded onto the conveyor 105. A position sensor is mounted to the three-axis gantry and configured to output signals representing positions of the three-axis gantry. In this example, the local controller 170 can then: interpret a set of positions of the three-axis gantry based on positions of the three-axis gantry detected by the position sensor; and interpolate a three-dimensional position—such as a surge position, a heave position, and a sway position (e.g., (x,y,z) position within the coordinate system of the non-threaded fastener extractor module 120)—of the non-threaded fastener end effector 122 within the work volume 109 based on the set of positions.

In another implementation, the stage 121 includes a robotic arm, such as a three-link robotic arm with base rigidly mounted to the chassis 102 and configured to reach the full length and width of the near side of a segment of a recycled wood workpiece 115 occupying the work volume 109. In this implementation, the set of actuators are configured to manipulate joints between the base and links of the robotic arm.

In a similar implementation, the stage 121 includes: a single-axis gantry arranged over (or adjacent, under) and parallel to the linear sled stage; and a two-link robotic arm mounted to the gantry and configured to cooperate with the gantry to reach the full length and width of the near side of a segment of a recycled wood workpiece 115 occupying the work volume 109. In this implementation, the set of actuators are configured to manipulate the gantry and joints between links of the robotic arm to reach the non-threaded fastener end effector 122 throughout the scope of the work volume 109.

Furthermore, the non-threaded fastener extractor module 120 can include a set of position sensors—such as linear or rotary encoders—coupled to joints of the robotic arm and/or to axes of the gantry of each non-threaded fastener extractor module 120. The local controller 170 can track the position of the distal end of the robotic arm—and therefore, the non-threaded fastener end effector 122—within the work volume 109 based on the positions of joints of the robotic arm and the position of the gantry within the work volume 109.

However, the multi-axis stage 121 can define any other configuration or arrangement of actuators and supporting structures.

7.2 Non-threaded Fastener End Effector

As described above, the non-threaded fastener end effector 122 is supported by the multi-axis stage 121 and includes: a bearing plate 123; a vertical stage 124 arranged on the multi-axis stage 121 and configured to advance the bearing plate 123 toward a non-threaded fastener in a recycled wood workpiece 115 occupying the work volume 109 and to retract the bearing plate 123 to withdraw the non-threaded fastener from the recycled wood workpiece 115; a jaw head 126 arranged on and rotationally coupled to a distal face of the bearing plate 123; a set of jaws 128 pivotably coupled to a distal end of the jaw head 126; a yaw actuator 127 arranged on the bearing plate 123; and a jaw actuator 125 arranged on the vertical stage 124, coupled to the set of jaws 128 via a jaw linking and configured to close the set of jaws 128 to engage the set of jaws 128 against the non-threaded fastener and to open the set of jaws 128 to release the non-threaded fastener from the set of jaws 128.

7.2.1 Vertical Stage

In one implementation, the vertical stage 124: is pivotably coupled to a distal end of the multi-axis stage 121; defines a jaw actuator mount configured to support and locate the jaw actuator 125; and includes a set of fixed standoffs 108 concentric with a W-axis of the jaws 128, the set of fixed standoffs 108 configured to receive a set of fixed rods. The set of fixed rods define distal ends pivotably coupled to the set of fixed standoffs 108 and proximal ends coupled to the bearing plate 123. The vertical stage 124 is also configured to support a bearing plate 123, advance the bearing plate 123 toward a non-threaded fastener in a recycled wood workpiece 115 occupying the work volume 109, and retract the bearing plate 123 to withdraw the non-threaded fastener from the recycled wood workpiece 115.

7.2.2 Jaw Actuator

The non-threaded fastener end effector 122 can include an electromechanical, pneumatic, or hydraulic jaw actuator 125: arranged on the vertical stage 124; coupled to the set of jaws 128 via a jaw linking including a gear; and configured to close the set of jaws 128 to engage the set of jaws 128 against the non-threaded fastener and to open the set of jaws 128 to release the non-threaded fastener from the set of jaws 128.

7.2.3 Bearing Plate+Yaw Actuator+Jaw Head

The bearing plate 123 includes: a proximal face configured to fasten distal ends of the set of fixed standoffs 108 and a distal end of the jaw actuator 125 to mount the jaw actuator 125 to the bearing plate 123; and a distal face opposite the proximal face. The jaw head 126 is rotationally coupled to the distal face of the bearing plate 123 via a thrust-bearing, the thrust-bearing configured to transfer a rotational force into the jaw head 126 to rotate the set of jaws 128 (e.g., Y-axis rotation, yaw) to a target orientation with no or minimal torque.

The yaw actuator 127 is arranged on the proximal face of the bearing plate 123, coupled to the jaw head 126, and configured to rotate the jaw head 126 about a yaw axis of the non-threaded fastener end effector 122.

7.2.4 Thrust Bearing+Gear

The non-threaded extractor end effector can also include a thrust bearing: interposed between the jaw head 126 and the set of jaws 128 of the non-threaded fastener end effector 122. The non-threaded fastener end effector 122 can also include a gear interposed between the distal face of the bearing plate 123 and the jaw head 126.

7.2.5 Jaws

The non-threaded fastener end effector 122 also includes a set of (e.g., two, three) jaws 128, each jaw 128 coupled to the jaw head 126 via a set of jaw pivots. The set of jaws 128 are operable in: a closed position to clamp against and retain a shaft and/or shank of a non-threaded fastener and to transfer a force into the non-threaded fastener to retract the non-threaded fastener from a recycled wood workpiece 115 during a non-threaded fastener removal cycle; and an open position to release the non-threaded fastener, such as into a fastener container 145 following completion of the non-threaded fastener removal cycle.

For example, each jaw 128 can include a hardened steel jaw 128 with a sharpened jaw surface configured to engage and retain a shaft and/or shank of a non-threaded fastener flush with a surface of a recycled wood workpiece 115, extending above the surface of the recycled wood workpiece 115, and/or extending below the surface of the recycled wood workpiece 115.

Therefore, at the start of a non-threaded fastener removal cycle, the local controller 170 can: autonomously navigate the non-threaded fastener end effector 122 to a target engagement position, via the multi-axis stage 121, and a target jaw position, via the yaw actuator 127, predicted by the local controller 170 to contain a shaft and/or shank of a non-threaded fastener. The vertical stage 124 can then advance the bearing plate 123 toward the non-threaded fastener in a recycled wood workpiece 115 occupying the work volume 109. The jaw actuator 125 can close the set of jaws 128 to engage the set of jaws 128 against the non-threaded fastener with a target clamping force and to open the set of jaws 128 to release the non-threaded fastener from the set of jaws 128. Upon completion of the non-threaded fastener retraction cycle, the vertical stage 124 can retract the bearing plate 123 toward the vertical stage 124 and open the set of jaws 128 to release the non-threaded fastener from the set of jaws 128 into a fastener container 145 at the end of the non-threaded fastener removal cycle.

7.3 W-Axis Home Position

In one implementation, the vertical stage 124: is mounted to the distal end of the multi-axis stage 121 via a linear slide; and is operable over a range of linear positions on the linear slide parallel to a W-axis of rotation of the jaws 128.

For example, the jaw actuator 125 can include a pneumatic piston coupled to a pressure reservoir and an exhaust via a set of valves. At the start of a non-threaded fastener removal cycle, the local controller 170: activates a first valve to supply pressurized air to the jaw actuator 125, which drives the jaw actuator 125 forward on the linear slide to stop at maximum extension; triggers the set of jaws 128 to close; and then closes the first valve and opens a second value to enable air in the jaw actuator 125 to vent to ambient, thereby reducing or eliminating forward force on the set of jaws 128. The local controller 170 can then activate the jaw actuator 125 to retract the bearing plate 123 toward the vertical stage 124 and the set of jaws 128 engaged with a non-threaded fastener—the latter of which backs out of the recycled wood workpiece 115 and thus drives the bearing plate 123 up the vertical stage 124.

The non-threaded fastener end effector 122 can also include a linear encoder, a set of home switches, or other position sensors coupled to the jaw actuator 125, the vertical stage 124, the jaw head 126, or the set of jaws 128. During a non-threaded fastener extraction cycle, the local controller 170 can: track the position of the jaw actuator 125 on the vertical stage 124 via the position sensor; track an offset distance between the jaws 128 during a non-threaded fastener removal cycle and detect extraction of a non-threaded fastener from a recycled wood workpiece 115 based on retraction of the bearing plate 123 to withdraw the non-threaded fastener from the recycled wood workpiece 115; detect removal of a non-threaded fastener (or failure of the non-threaded fastener) from a recycled wood workpiece 115 based on retraction of the bearing plate 123 toward the vertical stage 124 followed by the bearing plate 123 reaching a static linear position on the vertical stage 124 (and based on minimal or no load on the jaw actuator); and/or detect jaw slippage on a non-threaded fastener or inadvertent engagement of a threaded fastener based on absence of retraction of the bearing plate 123 toward the vertical stage 124 based on low load on the jaw actuator 125 and/or based on an offset distance between the set of jaws 128—detected by the linear position sensor—falling below an offset distance threshold.

In one implementation, the non-threaded fastener end effector 122 can include: a force sensor coupled to the set of jaws 128 and configured to output a first signal corresponding to a clamping force of the set of jaws 128; and a position sensor coupled to the jaw actuator 125, facing the set of jaws 128, and configured to output a second signal corresponding to an offset distance between each jaw 128 in the set of jaws 128. In this implementation, the local controller 170 can: interpret a first clamping force of the set of jaws 128 based on the first signal; interpret a first offset distance between each jaw 128 in the set of jaws 128 based on the second signal; and identify engagement of the set of jaws 128 with the fastener in the section of the recycled wood workpiece 115, in response to the first clamping force falling below a clamping force threshold and in response to the first offset distance exceeding an offset distance threshold.

Alternatively, the force sensor is configured to output a third signal corresponding to the clamping force of the set of jaws 128 and the position sensor is configured to output a fourth signal corresponding to the offset distance between each jaw 128 in the set of jaws 128. The local controller 170 can then: interpret a second clamping force of the set of jaws 128 based on the third signal; interpret a second offset distance between each jaw 128 in the set of jaws 128 based on the fourth signal; and identify jaw slippage of the set of jaws 128 with the fastener in the section of the recycled wood workpiece 115, in response to the first clamping force falling below the clamping force threshold and in response to the first offset distance falling below the offset distance threshold.

7.4 Non-Threaded Fastener Extractor Module: Degrees of Freedom

As described above, the multi-axis stage 121 is operable in three degrees of freedom to locate the non-threaded fastener end effector 122 over a range of positions within the work volume 109. The non-threaded fastener end effector 122 is pivotably coupled to the distal end of the multi-axis gantry via the vertical stage 124. Accordingly, the local controller 170 can drive the multi-axis stage 121 and the yaw actuator 127 to locate the jaws 128 adjacent (e.g., spanning) the shaft and/or shank of a non-threaded fastener protruding above a side of a recycled wood workpiece 115.

Furthermore, the non-threaded fastener end effector 122 can include a yaw actuator 127 to trigger a gear to transfer a rotational force to rotate the jaw head 126 and the set of jaws 128 (e.g., Y-axis rotation, yaw) according to a target orientation. The yaw actuator 127 thus defines a further degree of freedom of the non-threaded fastener end effector 122. Additionally, the non-threaded fastener end effector 122 includes a jaw actuator 125 configured to open and close the jaws 128 independently of the rotation of the jaws 128, and thus defines yet another degree of freedom of the non-threaded fastener end effector 122. Accordingly, the local controller 170 can actuate the jaw actuator 125 to clamp the jaws 128 against a non-threaded fastener extending above an adjacent side of the recycled wood workpiece 115.

Therefore, the multi-axis stage can support and locate the non-threaded fastener end effector 122 in three degrees of freedom. The jaw actuator locates the jaws in a translational degree of freedom (e.g., heave) and the yaw actuator 127 in a further rotational degree of freedom (e.g., yaw). Thus, the non-threaded fastener end effector 122 can support and locate the jaws 128 in five degrees of freedom.

However, the elements of the non-threaded fastener end effector 122 described above can be arranged in any other configuration to similarly support and locate the jaws in five degrees of freedom.

7.5 Non-Threaded Fastener Removal Cycle

In one implementation, once a section of a recycled wood workpiece 115 enters a work volume 109 of a non-threaded fastener extractor module 120, the local controller 170 calculates a position and predicted orientation of a non-threaded fastener—on the section of the recycled wood workpiece 115 (e.g., super surface, flush with the surface of the recycled wood workpiece 115, subsurface)—within a local coordinate system of the non-threaded fastener extractor module 120 based on: the position of the non-threaded fastener within the coordinate system of the virtual model; the predicted orientation of the non-threaded fastener, within the coordinate system of the virtual model, derived from the virtual model; the longitudinal position of the section of the recycled wood workpiece 115 within a global coordinate system of the system 100; and/or a known or stored position of the local coordinate system of the non-threaded fastener extractor module 120 relative to the global coordinate system. The local controller 170 also triggers the jaw actuator to fully advance and open the set of jaws.

Additionally, the local controller 170 can: interpolate the position of the set of jaws 128 and the orientation of the set of jaws 128 of the non-threaded fastener extractor module 120 within the local coordinate system based on positions of the multi-axis stage 121, the linear stage, etc. and based on an orientation of the gear; and autonomously navigate the multi-axis stage 121 and the gear to locate the set of jaws 128 adjacent (e.g., spanning) a segment of the non-threaded fastener extending above the adjacent surface of the recycled wood workpiece 115 and to locate the W-axis of the set of jaws 128 coaxial with the predicted orientation of the non-threaded fastener.

The local controller 170 can then: trigger the jaw actuator 125 to close the jaws 128, thereby clamping the jaws 128 onto the non-threaded fastener; and trigger the vertical stage 124 to retract the bearing plate 123, thereby extracting the non-threaded fastener from the recycled wood workpiece 115.

Furthermore, during this non-threaded fastener extraction cycle and as described above, the local controller 170 can: actuate the vertical stage 124 to bias (or "preload") the set of jaws 128 and the jaw actuator 125 away from the recycled wood workpiece 115 and thus maintain a continuous retraction force on the non-threaded fastener; track the position and offset distance of the set of jaws 128 via a linear position sensor; verify extraction of the non-threaded fastener from the recycled wood workpiece 115 responsive to retraction of the bearing plate 123 toward the vertical stage 124; and detect removal of the non-threaded fastener from the recycled wood workpiece 115 (or failure of the non-threaded fastener) responsive to subsequent cessation or retraction of the bearing plate 123 toward the vertical stage 124. Upon detecting removal (or failure) of the non-threaded fastener, the local controller 170 can: autonomously navigate the multi-axis stage 121 to locate the set of jaws 128 over the fastener container 145; trigger the jaw actuator 125 to open the set of jaws 128, thereby releasing the non-threaded fastener into the fastener container 145; verify removal of the non-threaded fastener in response to detecting an object passing the break beam or motion sensor on the fastener container 145 within a threshold duration (e.g., one second) after triggering the jaw actuator 125 to open the set of jaws 128; and record removal of the non-threaded fastener from the recycled wood workpiece 115, such as by annotating a representation of the non-threaded fastener in the virtual model with a "removed" flag.

The non-threaded fastener extractor module 120 can repeat this process for each other non-threaded fastener detected on the adjacent side of the recycled wood workpiece 115 occupying the work volume 109.

7.5.1 Superficial Straight Nail Removal Cycle

In one implementation, the local controller 170 can identify a straight nail normal to the surface of a recycled wood workpiece 115 occupying the work volume 109 and superficial to the recycled wood workpiece 115 (e.g., protruding above the surface of the of recycled wood workpiece 115) based on an image of the work volume 109 captured by the optical sensor 110.

For example, the local controller 170 can: detect a straight nail superficial to a surface of section of the recycled wood workpiece 115 based on features extracted from the image; detect a shank axis and an intersection of a shank and a nail head of the straight nail based on the features; trigger the stage (e.g., multi-axis stage 121) to drive the non-threaded fastener end effector 122 to a target engagement position to align the retraction axis of the set of jaws 128 coaxial with the axis of the straight nail; trigger the jaw actuator 125 to engage the straight nail at the intersection of the shank and the nail head (e.g., close the set of jaws 128 against the straight nail with a target clamping force, at the intersection of the shank and the nail head); trigger the stage (e.g., vertical stage 124) to retract the non-threaded fastener end effector 122 from the target engagement position to extract the straight nail from the recycled wood workpiece 115; and trigger the jaw actuator 125 to open the set of jaws 128 to release the straight nail into a fastener container 145.

Similarly, the local controller 170 can: extract a breadth of the nail head based on the features; calculate a centroid of the nail head based on the breadth; derive a target jaw position to locate the retraction axis of the set of jaws 128 coaxial with the centroid of the nail head; and trigger the jaw actuator 125 to open the set of jaws 128 by a distance proportional to the breadth of the head of the fastener, in response to driving the non-threaded fastener end effector 122 to the target engagement position. The local controller 170 can then implement methods and techniques described above to extract the straight nail from the recycled wood workpiece 115.

In another implementation, the local controller 170 can identify a second straight nail non-normal to the surface (e.g., angularly offset) of a recycled wood workpiece 115 occupying the work volume 109 and superficial to the recycled wood workpiece 115 (e.g., protruding above the surface of the of recycled wood workpiece 115) based on X-ray images. The local controller 170 can then: identify an engagement point at the entry of the shank of the second straight nail into the recycled wood workpiece 115; derive a shank axis of the second straight nail relative the recycled wood workpiece 115 based on the engagement point; calculate a target orientation for the set of jaws 128 based on the angular offset of the second straight nail; autonomously navigate the multi-axis stage 121 to align the retraction axis of the set of jaws 128 coaxial with the shank axis of the second straight nail; trigger the yaw actuator 127 to rotate the jaws 128 about the yaw axis of the non-threaded fastener end effector 122 to the target orientation; trigger the jaw actuator 125 to drive the set of jaws 128 to the engagement point and to close the set of jaws 128 against the second straight nail with a target clamping force to extract the second straight nail; trigger the vertical stage 124 to retract the bearing plate 123; and trigger the jaw actuator 125 to open the set of jaws 128 to release the second straight nail into a fastener container 145.

The local controller 170 can implement similar methods and techniques to remove each other straight nail normal and/or non-normal and superficial (e.g., protruding above the surface of the recycled wood workpiece 115) to each other recycled wood workpiece 115 occupying the work volume 109.

7.5.2 Subsurface+Flush Straight Nail Removal Cycle

Generally, the local controller 170 can implement the methods and techniques described above to remove a nail extending below and/or embedded within a surface of the recycled wood workpiece 115 (e.g., subsurface) and/or flush to the surface of the recycled wood workpiece 115.

In one implementation, the local controller 170 can identify a straight nail extending below the surface and/or embedded within the section of the recycled wood workpiece 115 based on an image of the work volume 109 captured by the optical sensor 110. Then, the local controller 170 can: access a maximum jaw depth for removing a straight nail (e.g., 0.5 inches); and calculate a target depth of the jaws 128 to engage a shank of the nail below the nail head, such as including plunging the jaws 128 below the surface of the recycled wood workpiece 115 to clamp against the shank of the nail. In particular, in this implementation, the local controller 170 can calculate the target depth for the jaws 128 as a function of a total length of the shank of the nail, such as a target depth corresponding to a distance below the nail head derived from an X-ray or color image of the recycled wood workpiece 115 and less than the maximum jaw depth.

In one variation, the local controller 170 can: access an image of the work volume 109 captured by the optical sensor 110 and identify a fastener embedded in the surface of the recycled wood workpiece 115 occupying the work volume 109 based on features extracted from the image; extract a position and orientation of a head of the fastener based on the features; access the virtual model (e.g., three-dimensional model) of the work volume 109 occupied by the recycled wood workpiece 115 labeled with fastener types, positions, and orientations; scan the three-dimensional model for a fastener; and identify the fastener in the virtual model labeled with a nail fastener type based on the position and the orientation of the head of the fastener. The local controller 170 can then identify the fastener embedded in the section of the recycled wood workpiece 115 as a nail and implement methods and techniques described above to extract the nail from the section of the recycled wood workpiece 115.

In another implementation, the local controller 170 can calculate the target depth for the jaws 128 as a function of a diameter of the head of the nail, such as a target depth corresponding to a distance below the nail head equivalent to one diameter of the nail head derived from an X-ray or color image of the recycled wood workpiece 115 and less than the maximum jaw depth. Furthermore, the local controller 170 can implement the methods and techniques described above for a straight and subsurface nail to autonomously navigate the multi-axis stage 121 and the gear to locate the set of jaws 128 adjacent (e.g., spanning) a segment of a non-threaded fastener extending below the adjacent surface of the recycled wood workpiece 115 based on the target depth of the set of jaws 128 and locate the retraction axis of the set of jaws 128 coaxial with the axis of the nail.

For example, the local controller 170 can: calculate a diameter (e.g., 9/32 inches) of the head of the straight nail and a length (e.g., 2.5 inches) of the shank of the straight nail; and calculate a target depth (e.g., 0.25 inches) of the jaws 128 to open and clear the head of the straight nail and to plunge below the surface (e.g., extend into the section) of the recycled wood workpiece 115 to clamp the shank of the straight nail. The local controller 170 can then derive the target jaw position to align the retraction axis of the set of jaws 128 coaxial with the shank axis of the straight nail; autonomously navigate the multi-axis stage 121, the yaw actuator 127, and the jaw actuator 125: to clamp the jaws 128 onto the shank of the straight nail, extending below the adjacent surface of the recycled wood workpiece 115, at the target depth (e.g., 0.25 inches) of the set of jaws 128; to locate the retraction axis of the set of jaws 128 coaxial with the axis of the straight nail; and to extract the straight nail extending below the surface of the recycled wood workpiece 115, along the shank axis, from the section of the recycled wood workpiece 115 (e.g., Y-axis of the non-threaded fastener extractor module 120).

7.5.3 Superficial Bent Nail Removal Cycle

In one implementation, the local controller 170 can identify a bent nail superficial to a recycled wood workpiece 115 occupying the work volume 109 (e.g., protruding above the surface of the of recycled wood workpiece 115); derive a position and an orientation of a shank of the bent nail in the work volume 109; and derive a curvature of the shank (e.g., shaft, shank) of the bent nail, based on features extracted from an image of the recycled wood workpiece 115 captured by the optical sensor 110.

In one variation, the local controller 170 can: identify an engagement point of the base of the shank of the bent nail entering the recycled wood workpiece 115; derive a shank axis of the bent nail relative the recycled wood workpiece 115 based on the engagement point; calculate a target orientation for the set of jaws 128 based on the curvature of the bent nail; autonomously navigate the multi-axis stage 121 to align the retraction axis of the set of jaws 128 coaxial with the shank axis of the bent nail; trigger the yaw actuator 127 to rotate the set of jaws 128 to the target orientation; trigger the jaw actuator 125 to close the set of jaws 128 against the bent nail with a target clamping force, at the engagement point to extract the bent nail along the shank axis from the recycled wood workpiece 115; trigger the vertical stage 124 to retract the bearing plate 123; and trigger the jaw actuator 125 to open the set of jaws 128 to release the bent nail into a fastener container 145.

For example, the local controller 170 can: define a target engagement position of the non-threaded fastener end effector 122, to engage the shank of the bent nail, based on the position and orientation of the bent nail within the work volume 109; derive a shank axis of the bent nail relative a longitudinal axis of the recycled wood workpiece 115 based on the target engagement position; define a target jaw position for the set of jaws 128 based on the curvature of the bent nail; trigger the stage to drive the non-threaded fastener end effector 122 to align a retraction axis of the set of jaws 128 coaxial with the shank axis of the bent nail; trigger the jaw actuator 127 to drive the set of jaws 128 to engage the shank of the bent nail at the target jaw position; and trigger the stage to retract the non-threaded fastener end effector 122 from the target engagement position to extract the bent nail, along the shank axis, from the recycled wood workpiece 115.

7.5.4 Subsurface+Flush Bent Nail Removal Cycle

In one implementation, the local controller 170 can identify a bent nail extending below the surface of the recycled wood workpiece 115 (e.g., subsurface) occupying the work volume 109 and derive a curvature of the shank (e.g., shaft, shank) of the bent nail below the surface of the recycled wood workpiece 115, based on an image of the recycled wood workpiece 115 captured by the optical sensor 110.

Then, the local controller 170 can: access a maximum jaw depth for removing a straight nail (e.g., 0.5 inches); and calculate a target depth of the jaws 128 to engage a shank of the bent nail below the nail head, such as including plunging the jaws 128 below the surface of the recycled wood workpiece 115 to clamp against the shank of the nail at an engagement point. In particular, in this implementation, the local controller 170 can calculate the target depth for the jaws 128 as a function of a total length of a straight segment of the shank of the nail, such as a target depth corresponding to a distance below the nail head derived from an X-ray or color image of the recycled wood workpiece 115 and less than the maximum jaw depth.

In one variation, the local controller 170 can identify an engagement point of the straight segment of the shank of the bent nail closest to the surface of the recycled wood workpiece 115; and derive a shank axis of the bent nail relative the recycled wood workpiece 115 based on the engagement point. The local controller 170 can then implement the methods and techniques described above to close the set of jaws 128 against the bent nail with a target clamping force, at the engagement point to extract the bent nail along the shank axis from the recycled wood workpiece 115.

In another variation, the local controller 170 can calculate a target retraction axis of the bent nail based on the curvature of the bent nail (e.g., 20% of the curvature of the curved nail, 30% of the curvature of the curved nail) to locate a jaw axis of the jaws 128 perpendicular to the recycled wood workpiece 115 (e.g., along the grain of the recycled wood workpiece 115) to reduce and/or eliminate accidental splitting of the recycled wood workpiece 115 during a bent nail removal cycle. Furthermore, the local controller 170 can calculate a target depth of the jaws 128 (e.g., 0.30 inches) to plunge below the surface of the recycled wood workpiece 115 and clamp the jaws 128 onto the shank of the bent nail. Then, the local controller 170 can autonomously navigate the multi-axis stage 121 and the yaw actuator 127: to locate the jaws 128 adjacent (e.g., spanning) the curvature of the bent nail extending below the adjacent surface of the recycled wood workpiece 115 according to the target retraction axis of the jaws 128 and the target depth of the jaws 128; and to locate the orientation of the jaws 128 coaxial with the predicted orientation of the bent nail.

For example, the local controller 170 can: detect a bent nail embedded in the section of the recycled wood workpiece 115 in the image; detect a curvature and a shank of the bent nail based on features extracted from the image of the work volume 109; calculate a target depth for the set of jaws 128 to extend into the section of the recycled wood workpiece 115 to engage the bent nail at the engagement point, based on the shank of the bent nail; derive a shank axis of the bent nail relative the longitudinal axis of the recycled wood workpiece 115 based on the curvature of the bent nail; derive a target jaw position to align the retraction axis of the set of jaws 128 coaxial with the shank axis of the bent nail; and retract the threaded fastener end effector 132 to extract the bent nail, along the shank axis, from the section of the recycled wood workpiece 115.

Thus, the local controller 170 can trigger the jaw actuator 125 to close the set of jaws 128 against the shank of a bent nail below the surface of the recycled wood workpiece 115, straighten the nail along the Y-axis, and extract the nail along the Y-axis of the non-threaded fastener extractor module 120 for the bent nail with minimal to no torque applied to the set of jaws 128, thereby reducing and/or eliminating failure (e.g., slipping, snipping, missing, accidental splitting of the recycled wood workpiece 115) during the bent nail removal cycle.

However, the local controller 170 can implement similar methods and techniques to remove a bent nail flush with the surface of the recycled wood workpiece 115.

7.5.5 Staple+Retainer Nail Removal Cycle

Generally, the local controller 170 can implement the methods and techniques described above to remove a staple, extending below and/or embedded within the surface of the recycled wood workpiece 115, according to a fastener removal schedule corresponding to a staple.

In one variation, the local controller 170 can access a table (e.g., list, chart) of staple dimensions and a predefined dimension threshold for staples and access an image of the work volume 109 captured by the optical sensor 110. Based on features extracted from the image, the local controller 170 can: detect a staple embedded in a surface of the recycled wood workpiece 115 occupying the work volume 109; derive a dimension of the staple in the work volume 109; and detect a first vertex (e.g., (x,y) position) of the staple defining a first height and a second vertex (e.g., (x,y) position) of the staple defining a second height less than the first height. Then, in response to the dimension of the staple falling below the threshold staple dimension, the local controller 170 can identify the staple as negligible (e.g., leave the staple within the recycled wood workpiece 115) and move on to a next non-threaded fastener in the recycled wood workpiece 115. For example, the local controller 170 can access a table (e.g., list, chart) of staple dimensions and a predefined dimension threshold (e.g., 26/8 or 26 mm crown and 8 mm legs) for staples. The local controller 170 can then identify the dimension of the staple (e.g., 24/6 or 24 mm crown and 6 mm legs) based on a first leg, a crown, and a second leg—extending below the surface of the recycled wood workpiece 115—and, in response to the dimension of the staple falling below the threshold staple dimension (e.g., 26/8 or 26 mm crown and 8 mm legs), the local controller 170 can identify the staple as negligible (e.g., leave the staple within the recycled wood workpiece 115) and move on to a next non-threaded fastener in the recycled wood workpiece 115.

Alternatively, in response to the dimension of the staple exceeding the threshold staple dimension, the local controller 170 can: derive a vertical plane between the first vertex and the second vertex of the staple based on the first height and the second height; define a target jaw position to align the retraction axis of the set of jaws 128 of the set of jaws 128 parallel to the vertical plane between the first vertex and the second vertex of the staple; identify the first vertex within a threshold distance of the surface of the recycled wood workpiece 115 (e.g., closest to the recycled wood workpiece 115 surface) based on the first height; derive a target depth for the set of jaws 128 to engage the first vertex of the staple based on the first height; trigger the jaw actuator 125 to drive the set of jaws 128 to engage the first vertex of the staple to a target engagement position (e.g., (x,y) position) and the target jaw position according to the target depth; and trigger the stage to retract the non-threaded fastener end effector 122 from the target engagement position to extract the staple, along the vertical plane (e.g., Y-axis of the non-threaded fastener extractor module 120), from the recycled wood workpiece 115.

For example, the local controller 170 can identify the next non-threaded fastener in the recycled wood workpiece 115 as a staple. Accordingly, the local controller 170 can identify the dimension of the staple (e.g., 28/10 or 28 mm crown and 10 mm legs) based on a first leg, a crown, and a second leg—extending below the surface of the recycled wood workpiece 115—and, in response to the dimension of the staple exceeding the threshold staple dimension (e.g., 26/8 or 26 mm crown and 8 mm legs), the local controller 170 can detect a first vertex (e.g., 4, 3) of the staple between a first point of the crown of the staple, a second point of the crown of the staple, and a third point at a distal end of a first leg of the staple, closest to the recycled wood workpiece 115 surface relative the extractor coordinate system of the non-threaded fastener extractor module 120. The local controller 170 can also detect a second vertex of the staple between the first point of the crown of the staple, the second point of the crown of the staple, and a fourth point at a distal end of a second leg of the staple. The local controller 170 can then trigger the jaw actuator 125 to extend the jaws 128 to clamp the staple at the first vertex (e.g., 4, 3) and to extract the staple along the Y-axis of the non-threaded fastener extractor module 120.

The local controller 170 can implement the methods and techniques described above to remove a staple, extending below the surface of the recycled wood workpiece 115, according to a fastener removal schedule corresponding to a staple. However, the local controller 170 can also implement the methods and techniques described above to remove a nail retainer, extending below the surface of the recycled wood workpiece 115, according to a fastener removal schedule corresponding to the nail retainer fastener.

7.6 Failures

Generally, the primary controller 160 (or the local controller 170 in the non-threaded fastener extractor module 120) can detect failures in the removal of non-threaded fasteners based on non-optical data captured by sensors arranged on the non-threaded fastener extractor module 120 and implement computer vision techniques to detect and distinguish common removal failures—such as slipped, snipped, missed, etc.—for each type of fastener (e.g., nail, screw, staple). The system 100 can then receive these common removal failures and update the fastener removal schedules to reduce failure of future non-threaded fasteners with analogous characteristics such as fastener type, location relative a recycled wood workpiece 115 (e.g., subsurface, super surface, flush), and/or fastener size.

In one implementation, during a non-threaded fastener removal cycle, the local controller 170 can track an applied force of the jaw actuator 125 and an offset distance between the set of jaws 128 based on sensors arranged in the non-threaded fastener end effector 122. Then, in response to detecting absence of an offset distance between the set of jaws 128 and in response to detecting a decrease in the applied force, the local controller 170 can: identify a snipped failure of the set of jaws 128 on a non-threaded fastener; trigger the jaw actuator 125 to release the set of jaws 128; update the target position, target orientation, and target depth for removal of the non-threaded fastener; and drive the yaw actuator 127 and the jaw actuator 125 to recenter the set of jaws 128 on the non-threaded fastener for the removal cycle.

Alternatively, in response to detecting absence of an offset distance between the set of jaws 128 and in response to detecting an increase in the applied force followed by a sharp decrease, the local controller 170 can: identify a slipped failure of the set of jaws 128 on a non-threaded fastener; trigger the jaw actuator 125 to open the jaws 128; update the target position, target orientation, and applied force for removal of the non-threaded fastener; and drive the yaw actuator 127 to rotate the jaws 128 and the jaw actuator 125 to recenter the jaws 128 on the non-threaded fastener for the removal cycle. The local controller 170 can repeat the foregoing process until the non-threaded fastener is removed from the recycled wood workpiece 115 and/or until an attempt threshold is achieved (e.g., 2 attempts, 3 attempts). Additionally, responsive to the quantity of attempts (e.g., 3 attempts) exceeding the attempt threshold (e.g., 2 attempts), the local controller 170 can identify the removal cycle as a miss failure and navigate the multi-axis stage 121 to locate the non-threaded fastener end effector 122 over the next non-threaded fastener in the recycled wood workpiece 115.

7.7 Non-Threaded Fastener Realignment

In one variation, during a non-threaded fastener removal cycle, the primary controller 160 (or the local controller 170 in the non-threaded fastener extractor module 120) can further: monitor load and/or back EMF on the set of actuators coupled to the multi-axis stage 121; monitor positions of the multi-axis stage 121 and the linear stage; interpret an angular offset between the axis of the non-threaded fastener and the W-axis of the jaws 128 based on positional oscillations in the non-threaded fastener extractor module 120 while the gear rotates the jaws 128; and then drive these to alternate positions to reduce these positional oscillations, improve alignment between the axis of the non-threaded fastener and the W-axis of the jaws 128, and thus reduce fatigue on the non-threaded fastener that may otherwise result in failure before complete removal of the non-threaded fastener from the recycled wood workpiece 115.

8. Threaded Fastener Extractor Module

As described above, the system 100 can include a set of threaded fastener extractor modules 130 for removing threaded fasteners embedded within and/or extending above a recycled wood workpiece 115. Each threaded fastener extractor module 130 includes: a multi-axis stage 131; a threaded fastener end effector; a set of module actuators; and a local controller 170.

In one implementation, each threaded fastener extractor module 130 is supported and manipulated on the chassis 102 via the stage, defines a rotational axis (e.g., R-axis), and includes: a ram 136 configured to rotate about the rotational axis; a ram actuator 137 configured to actuate the ram 136; a set of jaws 139 coupled to the ram 136 and configured to engage and retain metal fasteners from the section of the recycled wood workpiece 115; and a jaw actuator 138 configured to actuate the set of jaws 139.

8.1 Gantry and Actuators

In one implementation, the multi-axis stage 131 includes a three-axis gantry: supported by the chassis 102; arranged in a work volume 109 over a section of the linear sled stage; configured to face (e.g., is arranged over, under, or adjacent) one side of a recycled wood workpiece 115 loaded onto the sled; and configured to support the threaded fastener end effector over a range of vertical, lateral, and longitudinal positions to enable the threaded fastener end effector to access screws in a range of positions and orientations on the adjacent side of the recycled wood workpiece 115.

In this implementation, the threaded fastener end effector can also include two perpendicular rotational stages (e.g., B- and C-axes) arranged on the distal end of the three-axis gantry (e.g., X-, Y-, and Z-axes).

The set of actuators can include a set of stepper or servo motors coupled to and configured to independently actuate each axis of the stage, such as via a belt or leadscrew. Furthermore, the threaded fastener extractor module 130 can include a set of position sensors—such as rotary or linear encoders coupled to the set of actuators or directly to the stage, respectively. The local controller 170 can track the position of each axis of the stage via these position sensors and interpolate the three-dimensional position of the threaded fastener end effector—mounted to the third axis of the gantry—within the work volume 109 based on the combined positions of these axes of the stage.

For example, the three-axis gantry is arranged in the work volume 109 and facing a first side of the recycled wood workpiece 115 loaded onto the conveyor 105. A position sensor is mounted to the three-axis gantry and configured to output signals representing positions of the three-axis gantry. In this example, the local controller 170 can then: interpret a set of positions of the three-axis gantry based on positions of the three-axis gantry detected by the position sensor; and interpolate a three-dimensional position—such as a surge position, a heave position, and a sway position (e.g., (x,y,z) position within the coordinate system of the non-threaded fastener extractor module 120)—of the threaded fastener end effector within the work volume 109 based on the set of positions.

In another implementation, the stage includes a robotic arm, such as a three-link robotic arm with base rigidly mounted to the chassis 102 and configured to reach the full length and width of the near side of a segment of a recycled wood workpiece 115 occupying the work volume 109. In this implementation, the set of actuators are configured to manipulate joints between the base and links of the robotic arm.

In a similar implementation, the stage includes: a single-axis gantry arranged over (or adjacent, under) and parallel to the linear sled stage; and a two-link robotic arm mounted to the gantry and configured to cooperate with the gantry to reach the full length and width of the near side of a segment of a recycled wood workpiece 115 occupying the work volume 109. In this implementation, the set of actuators are configured to manipulate the gantry and joints between links of the robotic arm to reach the threaded fastener end effector throughout the scope of the work volume 109.

Furthermore, the threaded fastener extractor module 130 can include a set of position sensors—such as linear or rotary encoders—coupled to joints of the robotic arm and/or to axes of the gantry. The local controller 170 can track the position of the distal end of the robotic arm—and therefore, the threaded fastener end effector—within the work volume 109 based on the positions of joints of the robotic arm and the position of the gantry within the work volume 109.

However, the multi-axis stage 131 can define any other configuration or arrangement of actuators and supporting structures.

8.2 Threaded Fastener End Effector

As described above, the threaded fastener end effector is supported by the multi-axis stage 131 and includes: a housing 134; a ram 136 arranged in the housing 134 and operable between an extended position and a retracted position to accommodate retraction of a threaded fastener from a recycled wood workpiece 115; a set of jaws 139 arranged on a distal end of the ram 136; a jaw actuator 138 configured to close the set of jaws 139 against the threaded fastener; and a ram actuator 137 configured to rotate the ram 136 in the housing 134.

8.2.1 Housing

In one implementation, the housing 134: is pivotably coupled to a distal end of the multi-axis stage 131; includes a set of bearing journals concentric with an R-axis of the threaded fastener end effector 132; defines a ram actuator 137 mount configured to support and locate the ram actuator 137; and defines a jaw actuator 138 mount configured to support and locate the jaw actuator 138.

In one variation, the housing 134 is pivotably coupled to the stage and configured to support the ram 136. A spring 135 is arranged in the housing 134 and is configured to advance the ram 136 to a maximum extension position and retract the ram 136 to a minimum extension position.

8.2.2 Ram

The ram 136: defines an internal bore configured to support a pushrod; is supported by and configured to rotate in the set of bearing journals of the housing 134; and includes a mesh—such as a timing belt gear or timing gear—configured to couple to the ram actuator 137. A distal end of the ram 136: defines a set of (e.g., two) jaw pivots; and/or defines a linear bearing configured to support a distal end of the pushrod.

8.2.3 Jaws

The threaded fastener extractor module 130 also includes a set of (e.g., two, three) jaws 139, each: pivotably coupled to a jaw pivot at the distal end of the ram 136 of each threaded fastener extractor module 130. The set of jaws 139 are operable in: a closed position to clamp against and retain a head and/or shank of a screw and to transfer a torque (e.g., retraction force)—applied to the ram 136 by the ram actuator 137—into the screw to retract the screw from a recycled wood workpiece 115 during a screw removal cycle; and an open position to release the screw, such as into a fastener container 145 following completion of the screw removal cycle. For example, each jaw 139 can include a hardened steel jaw with serrated jaw surface configured to engage and retain a head or shank of a screw.

8.2.4 Pushrod and Jaw Actuator

The threaded fastener end effector can also include a pushrod: running inside the ram 136; defining a distal end that runs in and is supported by the linear bearing on the distal end of the ram 136; and coupled to each jaw 139 via a connecting rod.

The jaw actuator 138 can include an electromechanical, pneumatic, or hydraulic linear actuator: mounted to the housing 134 aft of the ram 136; and configured to advance and retract the pushrod within the ram 136, thereby clamping and releasing the set of jaws 139 on a screw in the closed and open positions, respectfully.

The threaded fastener extractor module 130 can also include: a thrust bearing—such as a captured spherical or tapered bearing—interposed between the proximal end of the pushrod and the jaw actuator 138 and configured to: transfer a linear force applied by the jaw actuator 138 into the pushrod to open or close the jaws 139; and transmit no or minimal torque on the pushrod—such as applied by the ram actuator 137 or a screw—into the jaw actuator 138 of a threaded fastener extractor module 130.

Therefore, at the start of a screw removal cycle, the local controller 170 can: trigger the jaw actuator 138 to retract the jaws 139, thereby opening the jaws 139 to receive a next fastener; autonomously navigate the threaded fastener end effector to a target position that the local controller 170 predicts contains a head and/or a shank of a screw; and trigger the jaw actuator 138 to advance the pushrod forward and to apply a target compressive force onto the proximal end of the pushrod, thereby driving the jaws 139 closed onto the screw and clamping the screw with a target clamping force. Upon completion of the screw retraction cycle, the local controller 170 can trigger the jaw actuator 138 to retract the pushrod, thereby opening the jaws 139 and releasing the screw.

8.3 R-Axis Home Position

In one implementation, the housing 134: is mounted to the distal end of the multi-axis stage 131 via a linear slide; and is operable over a range of linear positions on the linear slide parallel to the R-axis of rotation of the ram 136 (e.g., rotational axis of the threaded fastener end effector 132). In this implementation, the threaded fastener end effector can also include a secondary housing 134 actuator: coupled to the housing 134 or linear slide; configured to drive the housing 134—and therefore the ram 136, the set of jaws 139, etc.—forward to a home position in preparation for engaging the jaws 139 against a next screw; and configured to release forward pressure on the housing 134 to enable the housing 134 to retract from a nearby recycled wood workpiece 115 as rotation of the ram 136 extracts this screw from the recycled wood workpiece 115.

For example, the secondary housing 134 actuator can include a pneumatic piston coupled to a pressure reservoir and an exhaust via a set of valves. At the start of a screw removal cycle, the local controller 170: activates a first valve to supply pressurized air to the housing 134 actuator, which drives the housing 134 forward on the linear slide to stop at maximum extension; triggers the jaw actuator 138 to close the jaws 139; and then closes the first valve and opens a second value to enable air in the housing 134 actuator to vent to ambient, thereby reducing or eliminating forward force on the ram 136. The local controller 170 can then activate the ram actuator 137 to rotate the ram 136, the jaws 139, and the screw—the latter of which backs out of the recycled wood workpiece 115 and thus drives the housing 134 up the linear slide.

The threaded fastener end effector can also include a linear encoder, a set of home switches, or other position sensor coupled to the housing 134 or linear slide. During a screw removal cycle, the local controller 170 can: track the position of the housing 134 on the linear slide via the position sensor; detect extraction of a threaded fastener from a recycled wood workpiece 115 based on retraction of the housing 134 on the linear slide as the ram actuator 137 rotates the ram 136; detect removal of a threaded fastener (or failure of the screw) from a recycled wood workpiece 115 based on retraction of the housing 134 on the linear slide as the ram actuator 137 rotates the ram 136 followed by the housing 134 reaching a static linear position on the linear slide (and based on minimal or no load on the ram actuator 137); and/or detect jaw slippage on a screw or inadvertent engagement of a non-threaded fastener (e.g., a nail, a staple) based on absence of retraction of the housing 134 on the linear slide as the ram actuator 137 rotates the ram 136 and based on high load on the ram actuator 137.

For example, the local controller 170 can: trigger the ram actuator 137 to align the rotational axis of the threaded fastener end effector coaxial with the detected orientation of a non-threaded fastener; trigger the ram actuator 137 to rotate the ram 136 about the rotational axis of the threaded fastener end effector and the set of jaws 139 to retract the non-threaded fastener with the retraction force from the section of the recycled wood workpiece 115; and trigger the stage to retract the threaded fastener end effector from the first target engagement position to remove the threaded fastener from the section of the recycled wood workpiece 115.

8.4 Ram Actuator

The ram actuator 137: is mounted to the housing 134; is coupled to the mesh on the ram 136, such as via a geartrain or timing belt; and is configured to rotate the ram 136 about the R-axis. For example, the ram actuator 137 can include an electromechanical, pneumatic, or hydraulic rotary actuator.

8.5 Threaded Fastener Extractor Module: Degrees of Freedom

As described above, the multi-axis stage 131 is operable in three degrees of freedom to locate the threaded fastener end effector over a range of positions within the work volume 109. The threaded fastener end effector is pivotably coupled to the distal end of the multi-axis gantry via the two driven rotational axes—such as a two-axis gimble—operable in two additional degrees of freedom. Accordingly, the local controller 170 can drive the multi-axis stage 131 and these two driven rotational axes: to locate a rotational axis (e.g., the R-axis) of the ram 136 coaxial with a threaded fastener inset in a section of recycled wood workpiece 115 occupying the operation theater of the threaded fastener extractor module 130; and to locate the jaws 139 adjacent (e.g., spanning) the head or shank of the threaded fastener protruding above the adjacent face of the recycled wood workpiece 115.

The ram actuator 137 in the threaded fastener end effector is configured to rotate the ram 136 about the R-axis and thus defines a further degree of freedom of the threaded fastener end effector. Accordingly, the local controller 170 can actuate the ram actuator 137, thereby rotating the ram 136 and the jaws 139 and retracting a threaded fastener clamped by the jaws 139.

The jaw actuator 138 is coupled to the jaws 139 via a pushrod and thrust bearing, is configured to open and close the jaws 139 independently of rotation of the ram 136 and jaws 139, and thus defines a further degree of freedom of the threaded fastener end effector. Accordingly, the local controller 170 can actuate the jaw actuator 138 to clamp the jaws 139 against a threaded fastener extending above an adjacent side of the recycled wood workpiece 115.

Furthermore, the threaded fastener end effector is coupled to the two driven rotational axes (or to the multi-axis stage 131 more generally) via a linear slide operable over a range of linear positions parallel to the R-axis of rotation of the ram 136. As described above, the linear slide can enable the ram 136 and housing 134 to retract from the adjacent side of a recycled wood workpiece 115 as the threaded fastener end effector removes a threaded fastener from the recycled wood workpiece 115. Accordingly, the linear slide can define a further degree of freedom of the threaded fastener end effector.

Therefore, the multi-axis stage 131 can support and locate the two driven rotational axes in three degrees of freedom. The two driven rotational axes locate the linear slide in two additional rotational degrees of freedom. The linear slide locates the housing 134 in a further translation degree of freedom. The housing 134 locates the ram 136 in an additional rotational degree of freedom and the jaw actuator 138 and pushrod in a further translational degree of freedom. Thus, the threaded fastener end effector can support and locate the jaws 139 in eight degrees of freedom.

However, the threaded fastener end effector described above can be arranged in any other configuration to similarly support and locate the jaws 139 in eight degrees of freedom. For example: the multi-axis stage 131 can support and locate the two driven rotational axes in three degrees of freedom; the two driven rotational axes locate the housing 134 in two additional rotational degrees of freedom; the housing 134 locates the ram 136 in both a translational degree of freedom and a rotational degree of freedom; and the ram 136 supports the jaw actuator 138 and pushrod in a further translational degree of freedom. Therefore, in this example, the threaded fastener end effector can again support and locate the jaws 139 in eight degrees of freedom.

8.6 Screw Removal Cycle

In one implementation, once a section of a recycled wood workpiece 115 enters a work volume 109 of a threaded fastener extractor module 130, the local controller 170 calculates a position and predicted orientation of a screw—on the section of the recycled wood workpiece 115—within a local coordinate system of the threaded fastener extractor module 130 based on: the position of the screw within the coordinate system of the virtual model; the predicted orientation of the screw, within the coordinate system of the virtual model, derived from the virtual model; the position of the section of the recycled wood workpiece 115 within a global coordinate system of the system 100; and/or a known or stored position of the local coordinate system of the threaded fastener extractor module 130 relative to the global coordinate system. The local controller 170 also: triggers the jaw actuator 138 to open the jaws 139; and triggers the secondary housing 134 actuator to fully advance the linear slide.

The local controller 170 then: interpolates the position of the jaws 139 and the R-axis of the threaded fastener end effector 132 within the local coordinate system based on positions of the multi-axis stage 131, the two driven rotational axes, and the linear slide, etc.; and autonomously navigates the multi-axis stage 131 and the two driven rotational axes to locate the jaws 139 adjacent (e.g., spanning) a segment of the screw extending above the adjacent surface of the recycled wood workpiece 115 and to locate the R-axis of the ram 136 coaxial with the predicted orientation of the screw.

The local controller 170 then: triggers the jaw actuator 138 to close the jaws 139, thereby clamping the jaws 139 onto the screw; triggers the secondary housing 134 actuator to release the linear slide; and triggers the ram actuator 137 to rotate the ram 136, thereby rotating and extracting the screw from the recycled wood workpiece 115.

Furthermore, during this screw removal cycle and as described above, the local controller 170 can: actuate the secondary housing 134 actuator to bias (or "preload") the jaws 139 and the housing 134 away from the recycled wood workpiece 115 and thus maintain a continuous retraction force on the screw; track the position of the housing 134 on the linear slide via the position sensor; track load on the ram actuator 137 (e.g., based on current draw of the ram actuator 137 or by reading a torque sensor coupled to the ram actuator 137); verify extraction of the screw from the recycled wood workpiece 115 responsive to retraction of the housing 134 up the linear slide as the ram actuator 137 rotates the ram 136; and detect removal of the screw from the recycled wood workpiece 115 (or failure of the screw) responsive to subsequent cessation or retraction of the housing 134 up the linear slide and a drop in load on the ram actuator 137. Upon detecting removal (or failure) of the screw, the local controller 170 can: autonomously navigate the multi-axis stage 131 and the two driven rotational axes to locate the jaws 139 over the waste bin; trigger the jaw actuator 138 to open the jaws 139, thereby releasing the screw into the waste bin; verify removal of the screw in response to detecting an object passing the break beam or motion sensor on the waste bin within a threshold duration (e.g., one second) after triggering the jaw actuator 138 to open the jaws 139; and record removal of the screw from the recycled wood workpiece 115, such as by annotating a representation of the screw in the virtual model with a "removed" flag.

Furthermore, during a screw removal cycle, the primary controller 160 (or the local controller 170 in the threaded fastener extractor module 130) can: detect jaw slippage on a screw in response to detecting absence of retraction of the housing 134 on the linear slide as the ram actuator 137 rotates the ram 136 when load on the ram actuator 137 is high; and then trigger the jaw actuator 138 to release the jaws 139, drive the set of actuators to recenter the jaws 139 on the screw, and then repeat the foregoing process to remove the screw from the recycled wood workpiece 115.

In one implementation, the threaded fastener end effector 132 can include: a force sensor coupled to the threaded fastener end effector 132 and configured to output a first signal representing retraction force of the set of jaws 139 on a fastener during retraction of the fastener from the section of the recycled wood workpiece 115; and a position sensor configured to output a second signal corresponding to a position of the housing 134 on the stage. In this implementation, the local controller 170 can: interpret a first retraction force of the set of jaws 139 on the first fastener based on the first signal; interpret a first position of the housing 134 based on the second signal; and confirm extraction of the fastener from the section of the recycled wood workpiece 115, in response to the first position of the housing 134 falling within a first target position range and in response to the first retraction force of the set of jaws 139 falling below a retraction force threshold.

Alternatively, the force sensor is configured to output a third signal representing retraction force of the set of jaws 139 on the fastener and the position sensor is configured to output a fourth signal corresponding to the position of the housing 134 on the stage. The local controller 170 can then: interpret a second retraction force of the set of jaws 139 on the first fastener based on the third signal; interpret a second position of the housing 134 based on the fourth signal; and identify jaw slippage of the set of jaws 139 with the fastener in the section of the recycled wood workpiece 115, in response to the second position of the housing 134 falling within a second target position range less than the first target position range and in response to the second retraction force of the set of jaws 139 falling below the retraction force threshold.

The threaded fastener extractor module 130 can repeat this process for each other screw detected on the adjacent side of the recycled wood workpiece 115 occupying the work volume 109.

8.6.1 Superficial Screw Removal

In one implementation, the local controller 170 can identify a screw non-normal to the surface of a recycled wood workpiece 115 occupying the work volume 109 and superficial to the recycled wood workpiece 115 (e.g., protruding above the surface of the of recycled wood workpiece 115) based on an image of the work volume 109 captured by the optical sensor 110.

For example, the local controller 170 can: access the virtual model (e.g., three-dimensional model) of the work volume 109 occupied by the recycled wood workpiece 115 labeled with fastener types, positions, and orientations; scan the virtual model for the fastener; and identify the fastener in the virtual model labeled with a screw fastener type based on the position and the orientation of the shank of the fastener; access an image of the work volume 109 occupied by the section of the recycled wood workpiece 115 and extract a set of features from the image. Then, based on the set of features in the image, the local controller 170 can: detect a screw superficial to a surface of the recycled wood workpiece 115 occupying the work volume 109; and derive a position, an orientation, and a length of a shank of the screw in the work volume 109. The local controller 170 can then: define a target torque of the ram actuator 137, to rotate the ram 136 and the set of jaws 139 about the rotational axis of the threaded fastener end effector 132 to retract the screw, based on the length of the shank of the screw; define a shank axis of the screw relative a longitudinal axis of the recycled wood workpiece 115 based on the orientation of the shank of the screw; define a target engagement position of the threaded fastener end effector 132, to engage the screw, based on the position of the shank of the screw; trigger the stage to drive the threaded fastener end effector 132 to the target engagement position; trigger the ram actuator 137 to align the rotational axis of the threaded fastener end effector 132 coaxial with the shank axis of the shank of the screw; trigger the jaw actuator 138 to drive the set of jaws 139 to engage the shank of the screw in the section of the recycled wood workpiece 115 at the target engagement position; trigger the ram actuator 137 to rotate the ram 136 and the set of jaws 139 according to the target torque, to retract the screw, along the shank axis, from the section of the recycled wood workpiece 115; and trigger the stage to retract the threaded fastener end effector 132 from the target engagement position to remove the screw from the recycled wood workpiece 115.

8.6.2 Subsurface+Flush Screw Removal

In one implementation, the local controller 170 can identify a screw embedded within the surface and/or extending below the surface (e.g., subsurface) of a recycled wood workpiece 115 occupying the work volume 109 and flush to the recycled wood workpiece 115 based on an image of the work volume 109 captured by the optical sensor 110. In this implementation, the local controller 170 can implement methods and techniques described above to trigger the threaded fastener end effector 132 to engage a head of the screw for removal from the recycled wood workpiece 115.

For example, the local controller 170 can: derive a position and orientation of a head of the screw in the work volume 109 based on the set of features; define a shank axis of the screw relative a longitudinal axis of the recycled wood workpiece 115 based on the orientation of the head of the screw; define a target engagement position of the threaded fastener end effector 132, to engage the screw, based on the position of the head of the screw; trigger the stage to drive the threaded fastener end effector 132 to the target engagement position; trigger the ram actuator 137 to locate the rotational axis of the threaded fastener end effector 132 coaxial with the shank axis of the head of the screw; trigger the jaw actuator 138 to drive the set of jaws 139 to engage the head of the screw in the section of the recycled wood workpiece 115 at the target engagement position; trigger the ram actuator 137 to rotate the ram 136 and the set of jaws 139 to retract the screw, along the shank axis, from the section of the recycled wood workpiece 115; and trigger the stage to retract the threaded fastener end effector 132 from the target engagement position to remove the screw from the recycled wood workpiece 115.

8.7 Threaded Fastener Realignment

In one variation, during a screw removal cycle, the primary controller 160 (or the local controller 170 in the threaded fastener extractor module 130) can further: monitor torque (or load, back EMF) on the set of actuators coupled to the multi-axis stage 131, the two driven rotational axes, and the ram actuator 137; monitor positions of the multi-axis stage 131, the two driven rotational axes, and the linear slide; interpret an angular offset between the axis of the screw and the R-axis of the ram 136 based on torque and/or positional oscillations in the threaded fastener extractor module 130 while the ram actuator 137 rotates the ram 136; and then drives these to alternate positions to reduce these torque and/or positional oscillations, improve alignment between the axis of the screw and the R-axis of the ram 136, and thus reduce fatigue on the screw that may otherwise result in screw failure before the threaded fastener extractor module 130 fully removes the screw from the recycled wood workpiece 115.

For example, the local controller 170 can implement closed-loop controls to: serially oscillate each of the driven rotational axes and each axis of the multi-axis stage 131, such as over narrow angular or linear position windows; and update a target position of each axis of the threaded fastener extractor module 130 to positions that yield minimum and/or most consistent torque outputs on each stage as the ram actuator 137 rotates the ram 136 to extract the screw during the screw removal cycle.

In another example, the local controller 170 can track oscillation of axes within the threaded fastener extractor module 130 during a first rotation of the ram 136 during the screw removal cycle. In this example, the local controller 170 can then: pause rotation of the ram 136; trigger the jaw actuator 138 to release the jaws 139 from the screw; implement a threaded fastener extractor module 130 model to calculate an offset between the axis of the screw and the R-axis of the ram 136 based on the verified position of the screw and oscillation of each axis of the threaded fastener extractor module 130 during the first rotation ram 136; drive actuators in the threaded fastener extractor module 130 to reduce this offset; trigger the jaw actuator 138 to close the jaws 139 onto the screw; and resume the screw removal cycle.

Alternatively, the local controller 170 can: track oscillation of axes within the threaded fastener extractor module 130 during a first rotation of the ram 136 during the screw removal cycle; pause rotation of the ram 136; trigger the jaw actuator 138 to release the jaws 139 from the screw; characterize the range of oscillation of each axis of the threaded fastener extractor module 130; move each axis of the threaded fastener extractor module 130 to the center position within its corresponding range of oscillations during the first rotation of the ram 136; trigger the jaw actuator 138 to close the jaws 139 onto the screw; and then resume the screw removal cycle.

In yet another example, the local controller 170 can trigger the ram actuator 137 to rotate the ram 136 and the set of jaws 139 about the rotational axis of the threaded fastener end effector 132 to retract the screw from the section of the recycled wood workpiece 115 at a first time. The local controller 170 can then: record a retraction force of the set of jaws 139, via a force sensor arranged on the set of jaws 139, at the first time; retract the threaded fastener end effector 132 from a target engagement position to remove the screw from the section of the recycled wood workpiece 115 at a second time succeeding the first time; record a position of the threaded fastener end effector 132, via a position sensor arranged on the threaded fastener end effector 132, at the second time; and, in response to the retraction force of the set of jaws 139 falling below a retraction force threshold and in response to the position of the threaded fastener end effector 132 falling within a target position range, identify removal of the fastener from the section of the recycled wood workpiece 115 at the second time.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAM 136s, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for removing fasteners from a recycled wood workpiece comprising:
    receiving the recycled wood workpiece in a scan volume;
    accessing a first set of X-ray scans captured by an X-ray sensor facing the scan volume occupied by the recycled wood workpiece;
    detecting a set of internal features representing metallic objects in the first set of X-ray scans;
    compiling the first set of X-ray scans into a virtual model of the recycled wood workpiece, the virtual model annotated with the set of internal features;
    receiving a section of the recycled wood workpiece in a work volume of a fastener extractor module;
    accessing a first image captured by an optical sensor facing the work volume;
    detecting an external feature extending from the section of the recycled wood workpiece in the first image;
    scanning the virtual model for a first internal feature, in the set of internal features, analogous to the external feature of the section of the recycled wood workpiece;
    in response to identifying the first internal feature, in the set of internal features, analogous to the external feature of the section of the recycled wood workpiece in the virtual model:
        identifying the external feature as a first metal fastener embedded in the section of the recycled wood workpiece;
        extracting a first position and a first orientation of the first metal fastener from the virtual model; and
        defining a target engagement position for an extractor end effector, associated with the fastener extractor module, to engage the first metal fastener embedded in the section of the recycled wood workpiece based on the first position and the first orientation of the first metal fastener; and
    generating a fastener removal schedule for removal of the first metal fastener from the section of the recycled wood workpiece at the first target engagement position by the extractor end effector.

2. The method of claim 1:
    wherein identifying the external feature as the first metal fastener comprises:
        detecting a first face of the recycled wood workpiece within the virtual model containing the first metal fastener;
        characterizing a smoothness quality of the first internal feature corresponding to the first metal fastener based on the virtual model; and
        in response to the smoothness quality exceeding a threshold smoothness quality, identifying the first metal fastener embedded in the first face of the recycled wood workpiece as a nail;
    wherein defining the target engagement position comprises defining the target engagement position for a nail extractor end effector, associated with a nail fastener extractor module, to engage the nail embedded in the first face of the recycled wood workpiece based on the first position and first orientation of the nail; and
    wherein generating the fastener removal schedule comprises deriving the nail removal schedule for the nail extractor end effector to remove the nail from the first face of the recycled wood workpiece at the target engagement position.

3. The method of claim 1:
    wherein identifying the external feature as the first metal fastener comprises:
        detecting a first region from the virtual model representing a first face of the recycled wood workpiece containing the first metal fastener;
        detecting a second region from the first image representing the first face of the recycled wood workpiece; and
        correlating the first region from the virtual model with the second region from the first image; and
    wherein defining the target engagement position comprises defining the target engagement position within a local coordinate system of the fastener extractor model for the extractor end effector to engage the first metal fastener in the first face of the recycled wood workpiece based on the first position and the first orientation of the first metal fastener.

4. The method of claim 1, further comprising:
    detecting a set of faces of the recycled wood workpiece in the virtual model;
    accessing a template geometry representing a nominal face of a nominal wood workpiece; and
    for each face, in the set of faces, of the recycled wood workpiece:
        isolating a set of surface points of the face in the virtual model;
        projecting the template geometry of the nominal face onto the set of surface points of the face in the virtual model;
        calculating an offset distance between the template geometry of the nominal face and the set of surface points of the face in the virtual model; and in response to the offset distance falling below a threshold offset distance, storing the template geometry of the nominal face as a ground plane of the face in the virtual model.

5. The method of claim 4:
further comprising:
  detecting the first face of the recycled wood workpiece in the virtual model;
  scanning the virtual model for a set of superficial points extending from a ground plane of the first face, the set of superficial points representing an initial internal feature, in the set of features;
  isolating a first subset of points, in the set of superficial points, intersecting the ground plane of the first face in the virtual model, the first subset of points representing a shank of the initial internal feature, in the set of features;
  calculating a first centroid of the first subset of points;
  isolating a second subset of points, in the set of superficial points, of a first plane within a threshold distance of the ground plane of the first face, the first plane representing a head of the initial internal feature, in the set of features;
  calculating a second centroid of the second subset of points;
  calculating a first vector between the first subset of points and the second subset of points based on the first centroid and the second centroid; and
  labeling the set of points extending above the ground plane of the first face with the first vector in the virtual model, the first vector representing an initial orientation and an initial position of the head of the initial internal feature, in the set of features; and
  wherein identifying the external feature as the first metal fastener comprises identifying the initial internal feature, in the set of features, as the first metal fastener;
  wherein extracting the first position and the first orientation comprises extracting the initial position and the initial orientation from the virtual model; and
  wherein defining the first target engagement position comprises defining the first target engagement position for the extractor end effector to engage the first metal fastener embedded in the section of the recycled wood workpiece based on the initial position and the initial orientation.

6. The method of claim 4:
further comprising:
  detecting the first face of the recycled wood workpiece in the virtual model;
  scanning the virtual model for a set of superficial points extending from a ground plane of the first face, the set of points representing an initial metallic object;
  isolating a first subset of points, in the set of superficial points, extending from the ground plane of the first face, the first subset of points representing a head of the initial metallic object;
  characterizing a depth and a breadth of the head of the initial metallic object based on the first subset of points;
  isolating a second subset of points, in the set of superficial points, intersecting the ground plane of the first face in the virtual model, the second subset of points representing a shank of the initial metallic object; and
  characterizing a curvature of the shank of the initial metallic object based on the second subset of points; and wherein identifying the external feature as the first metal fastener comprises:
  calculating an aspect ratio of the head based on the depth and breadth of the head of the initial metallic object;
  in response to the aspect ratio exceeding a threshold aspect ratio and in response to the curvature of the shank of the initial metallic object exceeding a threshold curvature, identifying the fastener type of the initial metallic object as a bent nail;
  annotating the set of superficial points in the virtual model with a bent nail fastener type; and
  annotating the set of superficial points in the virtual model with a bent nail removal flag.

7. The method of claim 4:
further comprising:
  detecting a first face of the recycled wood workpiece in the virtual model;
  scanning the virtual model for a set of superficial points extending from a ground plane of the first face, the set of points representing an initial metallic object;
  isolating a first subset of points, in the set of superficial points, extending from the ground plane of the first face, the first subset of points representing a crown of the initial metallic object;
  isolating a second subset of points, in the set of superficial points, orthogonal to the first subset of points and intersecting the ground plane of the first face, the second subset of points representing a first leg of the initial metallic object;
  isolating a third subset of points orthogonal to the first subset of points and opposite the second subset of points intersecting the ground plane of the first face, the third subset of points representing a second leg of the initial metallic object; and
  characterizing a size of the initial metallic object based on the first subset of points, the second subset of points, and the third subset of points; and
wherein identifying the fastener type of each metal fastener in the set of metal fasteners comprises:
  in response to the size of the initial metallic object exceeding a threshold size, identifying the fastener type of the initial metallic object as a staple;
  annotating the set of superficial points in the virtual model with a staple fastener type; and
  annotating the set of superficial points in the virtual model with a staple removal flag.

8. The method of claim 1:
wherein identifying the external feature as the first metal fastener comprises:
  detecting a first face of the recycled wood workpiece within the virtual model containing the first metal fastener;
  characterizing a smoothness quality of the first internal feature corresponding to the first metal fastener based on the virtual model; and
  in response to the smoothness quality falling below a threshold smoothness quality, identifying the external feature as a screw embedded in the first face of the recycled wood workpiece;
wherein defining the target engagement position comprises defining the target engagement position for a screw extractor end effector, associated with a screw fastener extractor module, to engage the screw embedded in the first face of the recycled wood workpiece based on the first position and first orientation of the screw; and wherein generating the fastener removal schedule comprises deriving the screw removal schedule for the screw extractor end effector to remove the screw from the first face of the recycled wood workpiece at the target engagement position.

9. The method of claim 1, further comprising:
detecting a first subset of internal features representing metallic objects from the set of X-ray scans;
characterizing a first smoothness quality of the first subset of internal features;
detecting a second subset of internal features representing metallic objects from the set of X-ray scans;
characterizing a second smoothness quality of the second subset of internal features;
in response to the first smoothness quality exceeding a threshold smoothness quality, labeling the first subset of internal features with a non-threaded fastener type in the virtual model; and
in response to the second smoothness quality falling below the threshold smoothness quality, labeling the second subset of internal features with a threaded fastener type in the virtual model.

10. The method of claim 1:
wherein scanning the virtual model for the first internal feature, in the set of internal features, analogous to the external feature of the section of the recycled wood workpiece comprises:
   isolating a first subsection of the recycled wood workpiece represented in the virtual model containing the first internal feature, in the set of internal features, labeled with a non-threaded fastener type;
   isolating a secondary subsection of the recycled wood workpiece in the first image containing the first external feature; and
   correlating the secondary subsection of the recycled wood workpiece in the first image with the first subsection of the recycled wood workpiece represented in the virtual model; and
wherein identifying the first external feature as the first metal fastener comprises:
   isolating a subset of features from the secondary subsection of the recycled wood workpiece detected in the first image; and
   identifying the subset of features as a head of the first metal fastener embedded in the recycled wood workpiece in the virtual model.

11. The method of claim 1:
wherein defining the target engagement position comprises defining the target engagement position to locate a retraction axis of the extractor end effector orthogonal to a longitudinal axis of the recycled wood workpiece based on the first orientation; and
wherein generating the fastener removal schedule comprises deriving the fastener removal schedule for the extractor end effector to remove the first metal fastener from the section of the recycled wood workpiece at the first target engagement position along the retraction axis.

12. The method of claim 1, wherein compiling the first set of X-ray scans into the virtual model of the recycled wood workpiece comprises compiling the first set of X-ray scans into a three-dimensional model of the recycled wood workpiece, the three-dimensional model annotated with the set of internal features and defining a recycled wood workpiece coordinate system.

13. The method of claim 1:
wherein defining the target engagement position comprises defining the target engagement position for a robotic arm comprising the extractor end effector, associated with the fastener extractor module, to engage the first metal fastener embedded in the section of the recycled wood workpiece based on the first position and the first orientation of the first metal fastener; and
wherein generating the fastener removal schedule comprises deriving the fastener removal schedule for the robotic arm to remove the first metal fastener from the section of the recycled wood workpiece at the first target engagement position.

14. The method of claim 1:
further comprising:
   detecting a second external feature extending from the section of the recycled wood workpiece in the first image;
   scanning the virtual model for a second internal feature, in the set of internal features, analogous to the second external feature of the section of the recycled wood workpiece; and
   in response to identifying the second internal feature, in the set of internal features analogous to the second external feature of the section of the recycled wood workpiece in the virtual model:
      identifying the second external feature as a second metal fastener embedded in the section of the recycled wood workpiece;
      extracting a second position and a second orientation of the second metal fastener from the virtual model; and
      defining a second target engagement position for the extractor end effector, associated with the fastener extractor module, to engage the second metal fastener embedded in the section of the recycled wood workpiece based on the second position and the second orientation of the second metal fastener; and
wherein generating the fastener removal schedule comprises:
   defining a fastener extraction order to remove the first metal fastener and the second metal fastener from the section of the recycled wood workpiece based on the first target engagement position and the second target engagement position; and
   updating the fastener removal schedule for the extractor end effector to remove the first metal fastener at the first target engagement position and the second metal fastener at the second target engagement position from the recycled wood workpiece according to the fastener extraction order.

15. The method of claim 1, further comprising, in response to absence of correlation between the external feature of the section of the recycled wood workpiece in the first image and the first internal feature, in the set of internal features, in the virtual model:
   defining a bounding region containing the external feature in the first image;
   flagging the bounding region with a resection flag;
   generating a resection schedule to resect a subsection of the recycled wood workpiece corresponding to the bounding region in the first image; and
   assigning the resection schedule to the fastener extractor module.

16. A method for removing fasteners from a recycled wood workpiece comprising:
receiving the recycled wood workpiece populated with a set of metal fasteners;
accessing a first internal imaging scan captured by an internal imaging sensor facing the recycled wood workpiece;
detecting the set of metal fasteners embedded in the recycled wood workpiece based on internal features detected in the first internal imaging scan;
for each metal fastener in the set of metal fasteners:
  extracting an initial position of the metal fastener from the first internal imaging scan; and
  extracting an initial orientation of the metal fastener from the first internal imaging scan;
generating a virtual model of the recycled wood workpiece based on the first internal imaging scan, the virtual model annotated with initial positions and initial orientations of the set of metal fasteners;
accessing a first image captured by an optical sensor facing the recycled wood workpiece;
based on features detected in the first image:
  detecting a first metal fastener in the recycled wood workpiece occupying the work volume; and
  deriving a first position and a first orientation of the first metal fastener; and
in response to identifying the first metal fastener analogous to an initial metal fastener, in the set of metal fasteners, in the virtual model:
  isolating the first metal fastener in the virtual model; and
  generating a fastener removal schedule defining a tool path for an extractor end effector to extract the first metal fastener from the recycled wood workpiece based on the first position and the first orientation of the first metal fastener stored in the virtual model.

17. A system for extracting fasteners from a recycled wood workpiece comprising:
a chassis defining a scan volume and a work volume;
a conveyor:
  running from an entry of the chassis to an exit of the chassis; and
  configured to receive a recycled wood workpiece populated with metal fasteners;
an X-ray scan module:
  supported by and arranged within a threshold distance of the entry of the chassis; and
  comprising an X-ray sensor facing the scan volume;
an optical sensor facing the work volume;
a fastener extractor module comprising:
  a stage supported by the chassis; and
  an extractor end effector:
    supported and manipulated on the chassis via the stage; and
    configured to engage and retain metal fasteners from a section of the recycled wood workpiece occupying the work volume; and
a controller configured to:
  access a series of X-ray scans of the recycled wood workpiece within the scan volume captured by the X-ray sensor;
  compile the series of X-ray scans into a virtual model of the recycled wood workpiece annotated with positions, orientations, and fastener types of metal fasteners extracted from the series of X-ray scans;
  access an image of the work volume captured by the optical sensor;
  based on features detected in the image:
    detect a first metal fastener in the section of the recycled wood workpiece occupying the work volume; and
    derive a position and orientation of the first metal fastener;
  map the first metal fastener in the section of the recycled wood workpiece to the virtual model based on the position and orientation of the first metal fastener; and
  generate a fastener removal schedule defining a tool path for the extractor end effector to extract the first metal fastener from the section of the recycled wood workpiece.

18. The system of claim 17:
further comprising an optical scan module:
  arranged adjacent the X-ray scan module and opposite the entry of the chassis; and
  comprising an initial optical sensor facing the scan volume; and
wherein the controller is configured to:
  access a series of images of the recycled wood workpiece within the scan volume captured by the initial optical sensor; and
  compile the series of X-ray scans and the series of images into the virtual model of the recycled wood workpiece annotated with positions, orientations, and fastener types of metal fasteners extracted from the series of X-ray scans and the series of images.

19. The system of claim 17, wherein the controller is further configured to:
based on the virtual model:
  detect a first cluster of points representing an initial fastener in a first face of the recycled wood workpiece;
  isolate a first subset of points intersecting a ground plane of the first face of the recycled wood workpiece;
  calculate a first centroid of the first subset of points;
  isolate a second subset of points within a threshold distance of the ground plane and approximating a plane of a head of the initial fastener; and
  calculate a second centroid of the second subset of points;
calculate a first vector within the virtual model based on a combination of the first centroid and the second centroid;
annotate the first cluster of points in the virtual model with the first vector representing an initial orientation and an initial position of the head of the initial fastener; and
map the first metal fastener in the section of the recycled wood workpiece to the virtual model in response to the position and orientation of the first metal fastener corresponding to the vector representing the initial orientation and the initial position of the head of the initial fastener.

20. The system of claim 17:
further comprising a metal scan module:
  arranged on the chassis proximal the exit of the chassis; and
  comprising a metal line scanner facing the scan volume and configured to detect metal fasteners within the recycled wood workpiece; and wherein the controller is configured to:
- access a first metal scan of the recycled wood workpiece within the scan volume, captured by the metal line scanner; and
- trigger the conveyor to release the recycled wood workpiece to a recycled wood workpiece pallet.

* * * * *